(12) United States Patent
Ishitani et al.

(10) Patent No.: US 8,591,694 B2
(45) Date of Patent: Nov. 26, 2013

(54) METHOD FOR MANUFACTURING LIQUID CRYSTAL DISPLAY DEVICE

(75) Inventors: Tetsuji Ishitani, Isehara (JP); Takeshi Nishi, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 723 days.

(21) Appl. No.: 12/073,616

(22) Filed: Mar. 7, 2008

(65) Prior Publication Data

US 2008/0230179 A1  Sep. 25, 2008

(30) Foreign Application Priority Data

Mar. 23, 2007 (JP) ................... 2007-077137

(51) Int. Cl.
*G02F 1/13* (2006.01)
(52) U.S. Cl.
USPC .......................................... 156/292; 349/187
(58) Field of Classification Search
USPC .......................................... 156/292; 349/187
See application file for complete search history.

(56) References Cited

U.S. PATENT DOCUMENTS

| | | | |
|---|---|---|---|
| 4,458,987 A * | 7/1984 | Sasaki et al. ..................... 349/79 |
| 4,691,995 A | 9/1987 | Yamazaki et al. | |
| 5,239,398 A * | 8/1993 | Yanagisawa et al. ......... 349/135 |
| 5,263,888 A * | 11/1993 | Ishihara et al. ................. 445/25 |
| 5,490,001 A * | 2/1996 | Konuma ......................... 349/86 |
| 6,842,211 B2 | 1/2005 | Katsura | |
| 6,975,380 B2 | 12/2005 | Eguchi et al. | |
| 7,215,406 B2 | 5/2007 | Hiruma | |
| 7,595,857 B2 * | 9/2009 | Yang et al. ..................... 349/187 |
| 8,009,266 B2 | 8/2011 | Sawatari et al. | |

(Continued)

FOREIGN PATENT DOCUMENTS

| | | |
|---|---|---|
| CN | 101535882 | 9/2009 |
| EP | 2093610 | 8/2009 |

(Continued)

OTHER PUBLICATIONS

KR2005114124A, Kim et al. Method for fabricationg LCD by dropping isotropic liquid crystal, LG Display Co Ltd, Basic Abstract/Description, Derwnet class: P81 U14.*

(Continued)

*Primary Examiner* — Jeff Aftergut
*Assistant Examiner* — Jaeyun Lee
(74) *Attorney, Agent, or Firm* — Eric J. Robinson; Robinson Intellectual Property Law Office, P.C.

(57) ABSTRACT

To prevent alignment disorder of liquid crystal molecules, which is caused in manufacturing steps, and to manufacture a liquid crystal display device including a uniform liquid crystal layer in which liquid crystal molecules are aligned with high accuracy. In addition, to provide a technique for manufacturing a liquid crystal display device which is capable of fast response and high performance, and has high image quality with reduced display defects, with high yield. A method for manufacturing a liquid crystal display device, including dropping smectic liquid crystal by a dropping method in which a plurality of droplets of smectic liquid crystal are dropped to an alignment film so that the droplets are aligned in a line which is parallel to a rubbing direction of the alignment film which is formed in a region surrounded by a seal pattern of a sealant over a substrate.

20 Claims, 18 Drawing Sheets

(56) References Cited

U.S. PATENT DOCUMENTS

| | | | |
|---|---|---|---|
| 8,105,458 B2 * | 1/2012 | Ishitani et al. | 156/292 |
| 2001/0026348 A1 * | 10/2001 | Murata et al. | 349/187 |
| 2003/0223030 A1 * | 12/2003 | Byun et al. | 349/187 |
| 2004/0145692 A1 | 7/2004 | Yamazaki et al. | |
| 2004/0207800 A1 * | 10/2004 | Hiruma et al. | 349/189 |
| 2005/0122463 A1 * | 6/2005 | Byun et al. | 349/187 |
| 2006/0092369 A1 | 5/2006 | Nishi | |
| 2006/0110550 A1 | 5/2006 | Moriya | |
| 2006/0132702 A1 * | 6/2006 | Chen et al. | 349/187 |
| 2006/0158589 A1 | 7/2006 | Nishi et al. | |
| 2007/0064176 A1 | 3/2007 | Kubota et al. | |
| 2007/0087458 A1 | 4/2007 | Tanaka et al. | |
| 2007/0146568 A1 | 6/2007 | Yamazaki et al. | |
| 2007/0236640 A1 | 10/2007 | Kimura | |
| 2007/0284627 A1 | 12/2007 | Kimura | |
| 2010/0060844 A1 | 3/2010 | Sawatari et al. | |

FOREIGN PATENT DOCUMENTS

| | | | |
|---|---|---|---|
| JP | 06-160874 | 6/1994 | |
| JP | 06160874 A * | 6/1994 | G02F 1/1341 |
| JP | 09-160060 A | 6/1997 | |
| JP | 2001-133795 | 5/2001 | |
| JP | 2001-318384 A | 11/2001 | |
| JP | 2002-202510 A | 7/2002 | |
| JP | 2004-309723 | 11/2004 | |
| JP | 2004-344712 A | 12/2004 | |
| JP | 2004-361805 A | 12/2004 | |
| WO | WO-2008/059876 | 5/2008 | |

OTHER PUBLICATIONS http://www.tandfonline.com/doi/abs/10.1080/02678298908033202, p. 1 of 1 (abstract), "The effect of rubbed polymer films on the liquid crystal alignment", Ishihara et al., pp. 6669-6675 version of record first published Sep. 24, 2006.*

Chinese Office Action (Application No. 200810087206.7) Dated Nov. 16, 2010.

* cited by examiner 525a  531  521

557 565 564 563 556 568 562 561 531

E 525a 503a 502 521 504 503b 525b 523 526 527 520 F

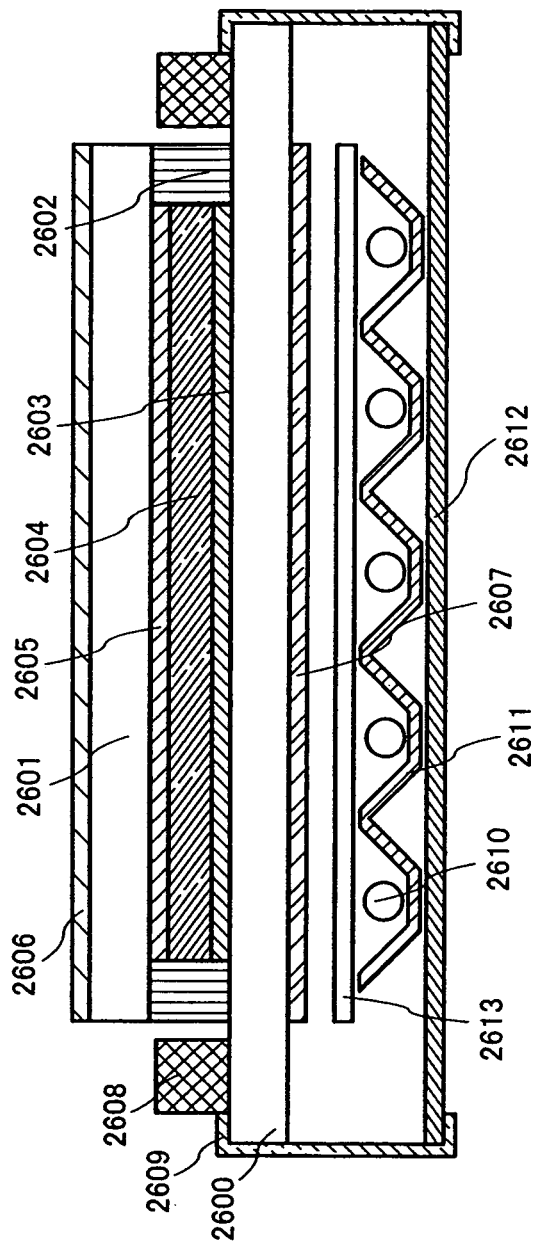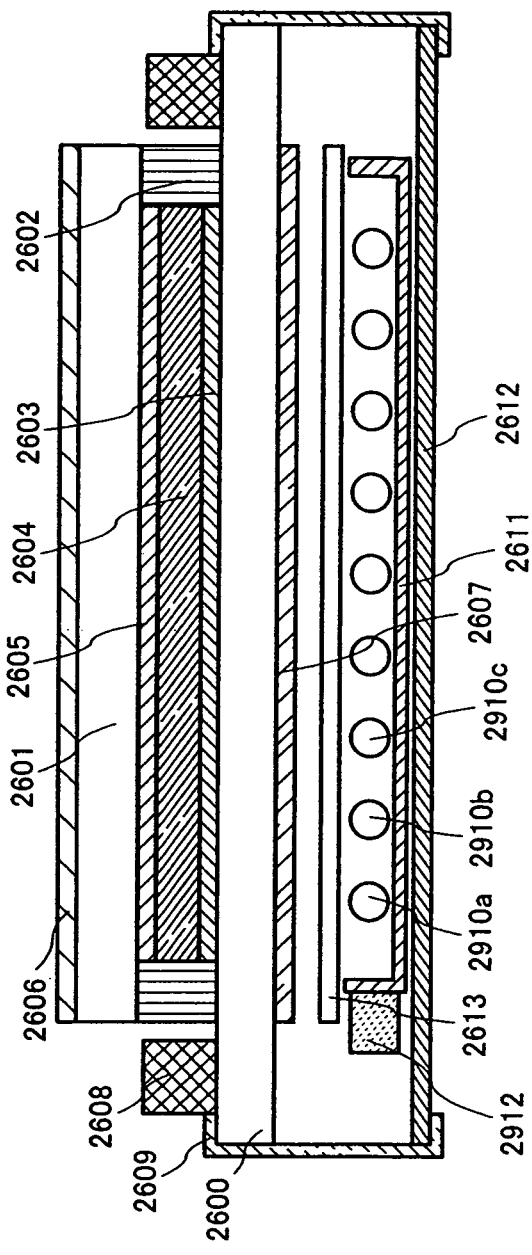
FIG. 10A
FIG. 10B

METHOD FOR MANUFACTURING LIQUID CRYSTAL DISPLAY DEVICE

BACKGROUND OF THE INVENTION

1. Field of the Invention

The present invention relates to liquid crystal display devices.

2. Description of the Related Art

In recent years, liquid crystal display devices are used in a wide range of fields such as liquid crystal televisions, PDAs, mobile phones, and office automation equipment like personal computers, as well as clocks and calculators.

In a liquid crystal display device, liquid crystal is sealed between two light transmitting substrates. When voltage is applied, an orientation of liquid crystal molecules is changed to change light transmittance, so that a predetermined image or the like is displayed optically.

Since liquid crystal display devices can be driven with low power and can be reduced in thickness and weight, further improvement has been made. Ferroelectric liquid crystal which is smectic liquid crystal has attracted attention as a liquid crystal material which allows improvement in a viewing angle and reduction in response time at the same time. Application of ferroelectric liquid crystal to a display has been under consideration (for example, see Patent Document 1: Japanese Published Patent Application No. 2004-309723).

SUMMARY OF THE INVENTION

As a method for forming a liquid crystal layer in a liquid crystal display device, there is a dipping method (also referred to as a pumping method or a vacuum injection method) in which a pair of substrates are attached to each other and then liquid crystal is injected therebetween utilizing capillary action.

However, there have been problems in that injection of liquid crystal using a dipping method is difficult and needs long time, and alignment disorder is occurred by injection because the smectic liquid crystal has high viscosity at room temperature.

It is an object of the present invention to prevent alignment disorder of liquid crystal molecules, which is caused in manufacturing steps, and to manufacture a liquid crystal display device including a uniform liquid crystal layer in which liquid crystal molecules are aligned with high accuracy. Therefore, the present invention provides a technique for manufacturing a liquid crystal display device which is capable of fast response and high performance, and has high image quality with reduced display defects, with high yield.

One aspect of the present invention is a method for manufacturing a liquid crystal display device in which a liquid crystal layer is formed by dropping smectic liquid crystal by a dropping method. According to the present invention, a plurality of droplets of smectic liquid crystal are dropped to an alignment film so that the droplets are aligned in a line which is parallel to the rubbing direction of the alignment film in a region surrounded by a seal pattern of a sealant over a substrate.

After dropping droplets of smectic liquid crystal, a pair of substrates are attached and the smectic liquid crystal quickly spreads on the alignment film in a direction perpendicular to the rubbing direction. This is because smectic liquid crystal is liquid crystal which has a layer structure and has a layer direction (a direction in which layers are formed with alignment of liquid crystal molecules) which is perpendicular to the rubbing direction. Accordingly, by dropping liquid crystal so that droplets are aligned in a direction parallel to the rubbing direction of the alignment film, a bubble does not get into the liquid crystal and collision traces of the droplets do not remain when the liquid crystal spreads to fill a seal pattern of a sealant. Therefore, alignment disorder of liquid crystal molecules due to a bubble or collision of the droplets can be prevented.

Therefore, a uniform liquid crystal layer of smectic liquid crystal in which alignment disorder of liquid crystal molecules, which is caused in manufacturing steps, can be prevented and liquid crystal molecules are aligned with high accuracy can be formed. Since smectic liquid crystal like ferroelectric liquid crystal has a high response speed, a liquid crystal display device with a high response speed and reduced display defects can be manufactured by using a liquid crystal layer formed according to the present invention. Therefore, a liquid crystal display device with improved performance and image quality can be manufactured with high yield according to the present invention.

The present invention can be applied to a liquid crystal display device, which includes a liquid crystal element as a display element and has a display function. The liquid crystal display device may also refer to a display panel provided with a plurality of pixels including display elements like liquid crystal elements and a peripheral driver circuit for driving such pixels over a substrate. Further, the liquid crystal display device may include a flexible printed circuit (FPC), a printed wiring board (PWB), an IC, a resistor, a capacitor, an inductor, a transistor, or the like. Further, the liquid crystal display device may include an optical sheet such as a polarizing plate or a retardation plate. Further, the liquid crystal display device may include a backlight (which may include a light guide plate, a prism sheet, a diffusion sheet, a reflective sheet, or a light source (e.g., an LED or a cold cathode fluorescent lamp)).

Note that liquid crystal display devices using a liquid crystal element refer to a transmissive liquid crystal display device (a transmissive liquid crystal display), a transflective liquid crystal display device (a transflective liquid crystal display), and a reflective liquid crystal display device (a reflective liquid crystal display).

One aspect of a method for manufacturing a liquid crystal display device according to the present invention, includes: forming a frame-shaped seal pattern of a sealant over one of a pair of substrates on which rubbing treatment is performed, dropping smectic liquid crystal into the frame-shaped seal pattern more than once so that droplets are aligned in a direction parallel to a direction of the rubbing treatment, attaching the pair of substrates to each other with the sealant interposed therebetween to sandwich the smectic liquid crystal, and spreading the smectic liquid crystal to fill the frame-shaped seal pattern.

Another aspect of a method for manufacturing a liquid crystal display device according to the present invention, includes: forming a frame-shaped seal pattern of a sealant over one of a pair of substrates on which rubbing treatment is performed, dropping smectic liquid crystal into the frame-shaped seal pattern more than once so that droplets are partially overlapped with one another and aligned in a direction parallel to a direction of the rubbing treatment, attaching the pair of substrates to each other with the sealant interposed therebetween to sandwich the smectic liquid crystal, and filling the frame-shaped seal pattern with the smectic liquid crystal.

In the foregoing structure, in the case of a transmissive liquid crystal display device which uses a light source (e.g., a backlight), light transmitting substrates may be used as the pair of substrates and light from the light source may be transmitted to a viewing side. In the case of a reflective liquid crystal display device, a reflective electrode is used as an electrode provided on one of the pair of substrates, for example, a pixel electrode layer may be formed of a reflective material.

The substrate onto which the liquid crystal is dropped may be either a counter substrate or an element substrate provided with a semiconductor element or the like. The step of attaching the substrates may be performed under reduced pressure. Further, the liquid crystal may be heated to lower the viscosity at the time of dropping. After the substrates are attached and the sealant is cured, heat treatment may be performed. By heat treatment, alignment disorder of the liquid crystal molecules can be corrected.

According to the present invention, a uniform liquid crystal layer of smectic liquid crystal in which alignment disorder of liquid crystal molecules which is caused in manufacturing steps, can be prevented and liquid crystal molecules are aligned with high accuracy can be formed. Since smectic liquid crystal like ferroelectric liquid crystal has a high response speed, a liquid crystal display device with a high response speed and reduced display defects can be manufactured by using a liquid crystal layer formed according to the present invention. Therefore, a liquid crystal display device with improved performance and image quality can be manufactured with high yield according to the present invention.

BRIEF DESCRIPTION OF THE DRAWINGS

FIGS. 10A and 10B are cross-sectional views illustrating a liquid crystal display module according to an aspect of the present invention;

DETAILED DESCRIPTION OF THE INVENTION

Figure 1A:
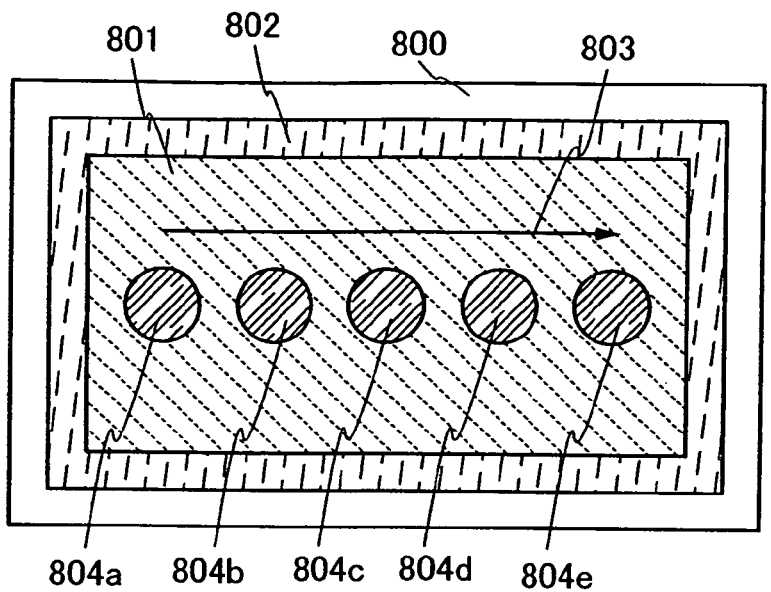
FIGS. 1A to 1C are conceptual views according to an aspect of the present invention.

Hereinafter, embodiment modes and an embodiment of the present invention will be described with reference to the drawings. Note that the present invention can be implemented in many different modes and it will be readily appreciated by those skilled in the art that modes and details can be modified in various ways without departing from the spirit and scope of the present invention. Accordingly, the present invention should not be construed as being limited to the description of the embodiment modes and the embodiment given below. Note that like portions in the drawings for describing the embodiment modes and the embodiment are denoted by the like reference numerals and repeated explanations thereof are omitted.

Embodiment Mode 1

This embodiment mode describes an example of a liquid crystal display device including a uniform liquid crystal layer in which alignment disorder of liquid crystal molecules is prevented and liquid crystal molecules are aligned with high accuracy in order to achieve improved performance and image quality.

Figure 1B:
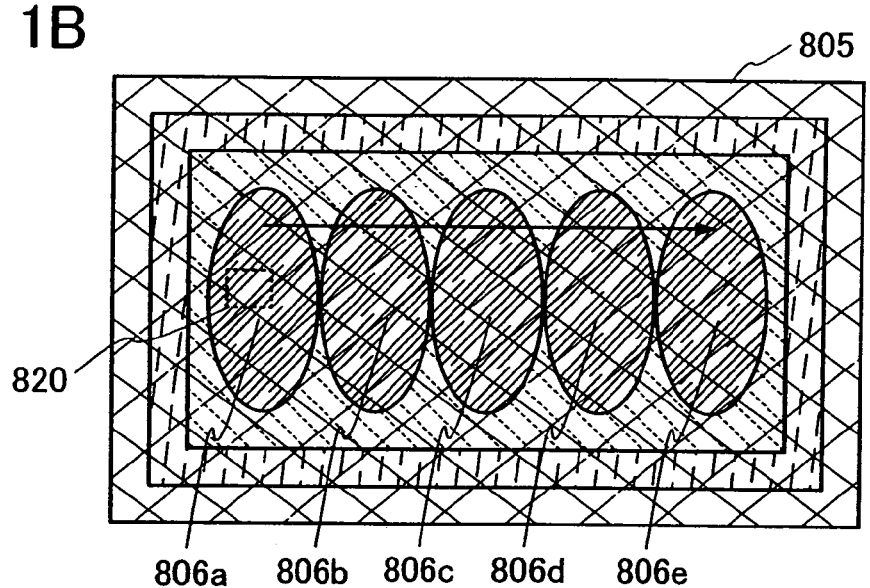
Figure 1C:
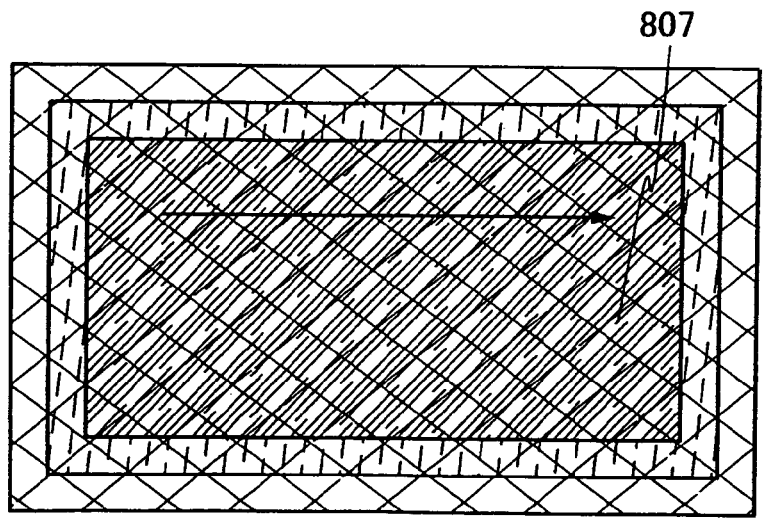

FIGS. 1A to 1C show a method for manufacturing a liquid crystal display device of this embodiment mode according to the present invention. In FIGS. 1A to 1C, an insulating layer 801 serving as an alignment film and a sealant 802 formed into a frame-shaped seal pattern are provided over a first substrate 800. The insulating layer 801 has its surface rubbing-treated in a rubbing direction which is denoted by the arrow 803 to serve as an alignment film.

As shown in FIG. 1A, smectic liquid crystal is dropped as droplets 804a, 804b, 804c, 804d, and 804e so that the droplets are aligned in a line parallel to the rubbing direction of the insulating layer 801 serving as an alignment film.

While rubbing directions of insulating layers which are a pair of opposing alignment films are parallel (parallel rubbing) in FIGS. 1A to 3, the rubbing directions may be anti-parallel (anti-parallel rubbing). In the present invention, even in the case of anti-parallel rubbing in which rubbing directions (vectors) are different, liquid crystal is dropped so that droplets thereof are in parallel to the rubbing direction of the insulating layer which is an alignment film to which the liquid crystal is dropped.

Next, a second substrate 805 is attached to the first substrate 800 with the sealant 802 interposed therebetween. The droplets 804a, 804b, 804c, 804d, and 804e are crushed and spread to be droplets 806a, 806b, 806c, 806d, and 806e with the second substrate 805 (see FIG. 1B).

The droplets 804a, 804b, 804c, 804d, and 804e of smectic liquid crystal are dropped. Then the droplets are quickly spread in a direction perpendicular to the rubbing direction (the direction denoted by the arrow 803) over the insulating layer 801 serving as an alignment film when the pair of substrates (the first substrate 800 and the second substrate 805) are attached to each other. Accordingly, the droplets 804a, 804b, 804c, 804d, and 804e are spread out into ellipses like the droplets 806a, 806b, 806c, 806d, and 806e which have a major axis in the direction perpendicular to the rubbing direction.

Figure 3:
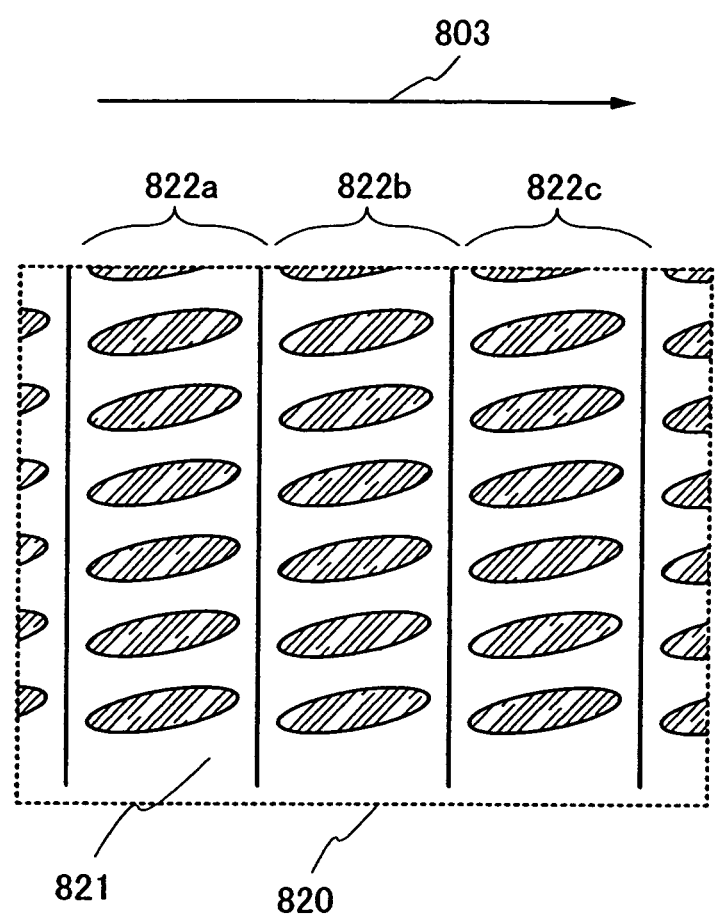
FIG. 3 is a schematic view illustrating alignment of liquid crystal molecules according to an aspect of the present invention.

FIG. 3 is an enlarged view of a region 820 in the droplet 806a and is a schematic view of an example of alignment of smectic liquid crystal molecules. Liquid crystal molecules 821 have a layer structure including layers 822a, 822b, and 822c and are aligned with their major axes having the same orientation. The layers 822a, 822b, and 822c which are formed by alignment of liquid crystal molecules each have a layer direction (a direction in which the layers are formed) perpendicular to the rubbing direction (the direction denoted by the arrow 803).

As described above, smectic liquid crystal is liquid crystal having a layer structure and its layer direction (a direction in which the layers are formed by alignment of liquid crystal molecules) is perpendicular to the rubbing direction (the direction denoted by the arrow 803).

Since droplets of smectic liquid crystal spread in the layer direction over the alignment film, if a plurality of droplets of liquid crystal are dropped in the layer direction which is perpendicular to the rubbing direction, there may be a filling defect such as contamination of a bubble among the droplets or collision of the droplets.

Therefore, when a plurality of droplets of liquid crystal are dropped to be aligned in a line parallel to the rubbing direction of the alignment film, the liquid crystal can be filled in and in contact with a seal pattern formed of a sealant to form a liquid crystal layer 807 (see FIG. 1C). Thus, according to the present invention, when the liquid crystal spreads to fill the seal pattern of the sealant, a bubble does not get into the liquid crystal and collision traces of the droplets do not remain, so that alignment disorder of liquid crystal molecules due to a bubble or collision of the droplets can be prevented. Accordingly, a uniform liquid crystal layer of smectic liquid crystal in which alignment disorder of liquid crystal molecules which is caused in manufacturing steps, can be prevented and the liquid crystal molecules are aligned with high accuracy can be formed.

Since smectic liquid crystal like ferroelectric liquid crystal has a high response speed, a liquid crystal display device with a high response speed and reduced display defects can be manufactured by using a liquid crystal layer of smectic liquid crystal formed according to the present invention. Therefore, a liquid crystal display device with improved performance and image quality can be manufactured with high yield according to the present invention.

Figure 2A:
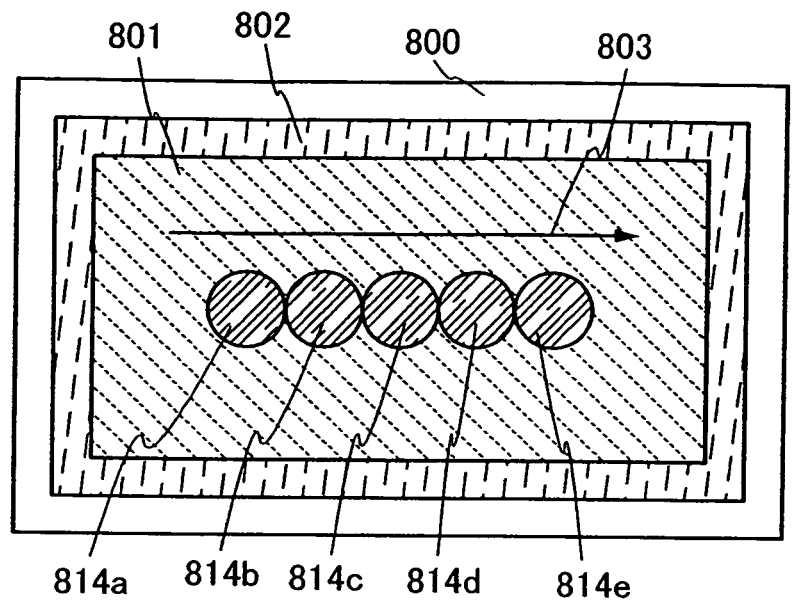
FIGS. 2A and 2B are conceptual views according to an aspect of the present invention.
Figure 2B:
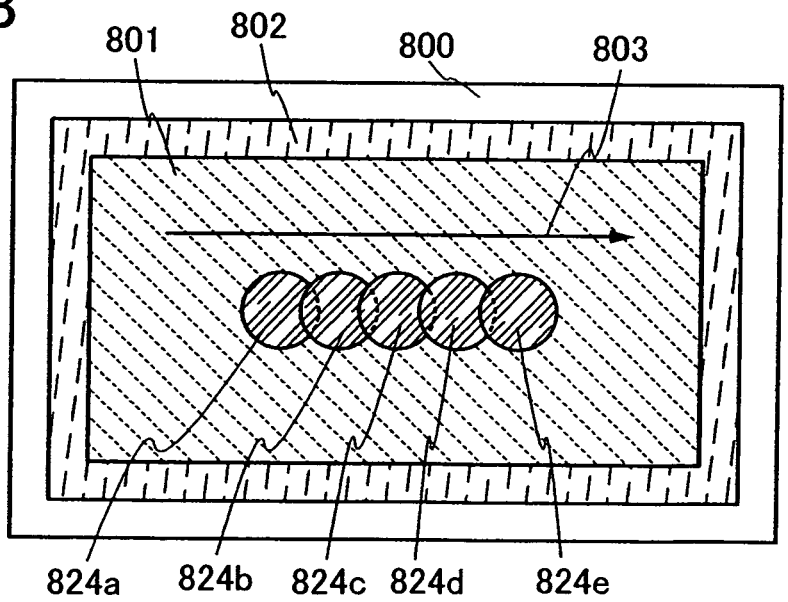

Note that as long as droplets of smectic liquid crystal are dropped to be aligned in a line along the rubbing direction, the droplets may be dropped so as to be in contact with one another. FIG. 2A shows an example in which smectic liquid crystal is dropped in a manner such that adjacent droplets which have been dropped are in contact with each other. Smectic liquid crystal are dropped in a manner such that droplets 814a, 814b, 814c, 814d, and 814e are in contact with the adjacent droplets, and the droplets are aligned in the direction parallel to the rubbing direction over the insulating layer 801. FIG. 2B shows an example in which adjacent droplets of smectic liquid crystal which have been dropped overlap with one another. Smectic liquid crystal are dropped in a manner such that droplets 824a, 824b, 824c, 824d, and 824e partially overlap with adjacent droplets and the droplets are aligned in the direction parallel to the rubbing direction over the insulating layer 801. As described above, as long as droplets of the smectic liquid crystal are dropped to be aligned in a line parallel to the rubbing direction, the droplets may be dropped so as to be in contact with one another or so as to overlap with one another. Further, the timing of dropping the droplets is not limited and a plurality of droplets may be dropped at the same time using a head having a plurality of discharge outlets or the droplets may be dropped one by one so as to be aligned in a line.

Figure 4:
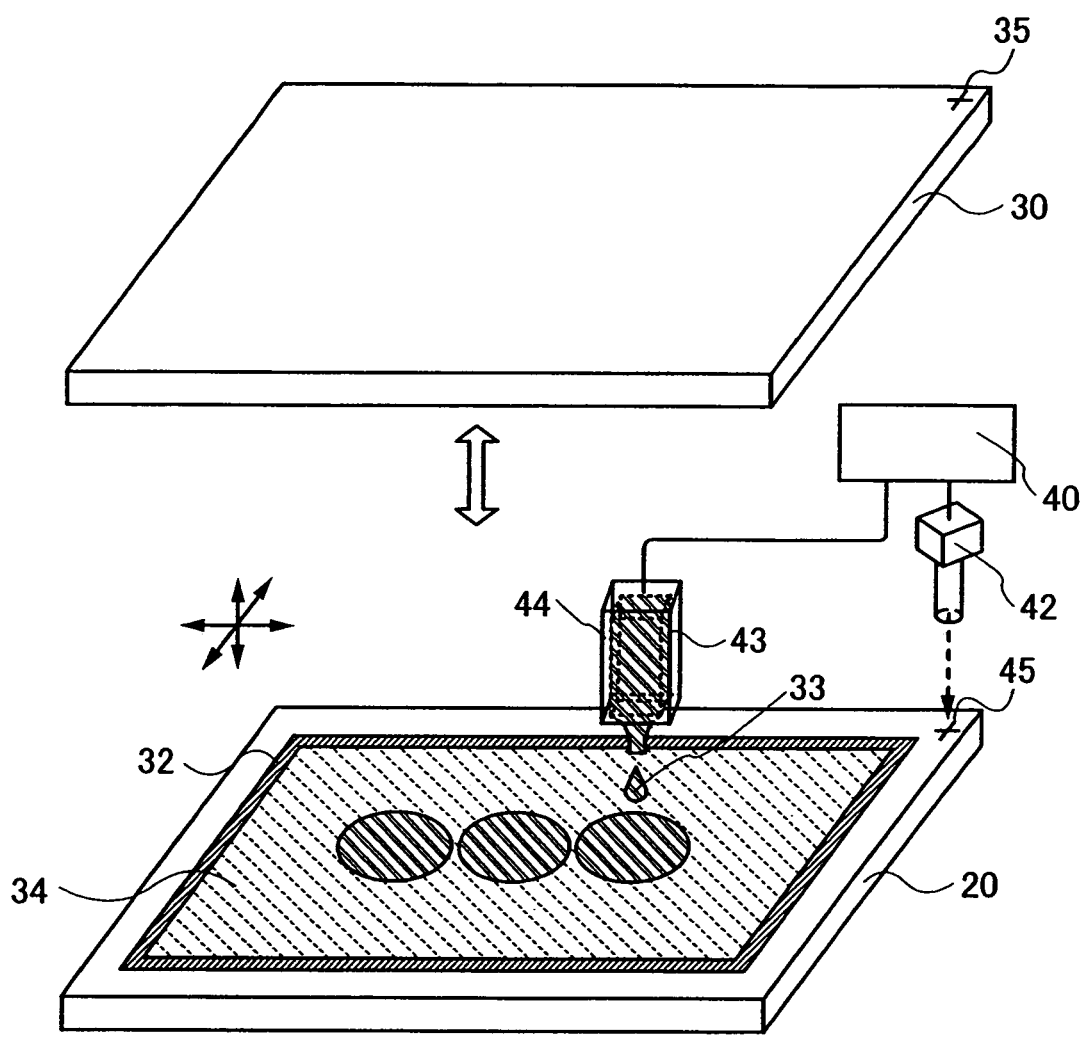
FIG. 4 is a diagram illustrating a method for manufacturing a liquid crystal display device of the present invention.

A liquid crystal dropping apparatus and a liquid crystal dropping method for a dispenser type which can be used in the present invention are described with reference to FIG. 4. A liquid crystal dropping apparatus in FIG. 4 includes a control device 40, an imaging means 42, a head 43, a heater 44, liquid crystal 33, and markers 35 and 45. FIG. 4 also shows an insulating layer 34 serving as an alignment film, a sealant 32, a first substrate 20, and a second substrate 30. After the sealant 32 is disposed, a plurality of droplets of the liquid crystal 33 are dropped into the sealant from the head 43 to be aligned in a line parallel to a rubbing direction of the insulating layer 34 serving as an alignment film. The liquid crystal 33 to be dropped is heated by the heater 44 to lower the viscosity so that the liquid crystal 33 can be dropped. The first substrate 20 and the second substrate 30 are attached to each other so that the liquid crystal fills the seal pattern of the sealant and the sealant 32 is cured; thus, a liquid crystal layer is formed.

After the first substrate and the second substrate are attached to each other with the liquid crystal layer filling the seal pattern of the sealant, it is preferable that the sealant be cured and heat treatment be performed. By heat treatment, alignment disorder of the liquid crystal molecules can be further corrected. Note that such an attaching step is preferably performed under reduced pressure.

Examples of smectic liquid crystal which can be used in the present invention are ferroelectric liquid crystal (FLC), and antiferroelectric liquid crystal (AFLC). Further, a UV curable resin may be added to smectic liquid crystal. For example, a polymer stabilized ferroelectric liquid crystal (PS-FLC) in which a UV curable resin is added to ferroelectric liquid crystal can be used.

A mode which is used in a liquid crystal display device of the present invention may be either a bistable mode or a monostable mode. An example of the bistable mode is a surface stabilized (SS)-FLC mode, and an example of the monostable mode is a V-FLC mode and a half V (HV)-FLC mode. As the V-FLC mode, there are a PS-V-FLC mode and an AFLC mode. As the half V (HV)-FLC mode, there are an FLC mode and a PS-HV-FLC mode.

Figure 18A:
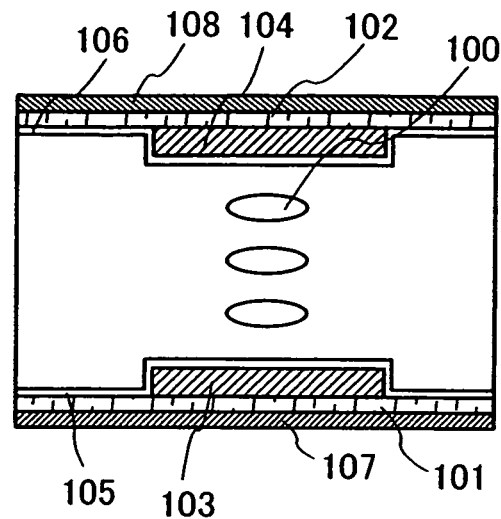
FIGS. 18A and 18B are diagrams illustrating liquid crystal modes according to an aspect of the present invention.
Figure 18B:
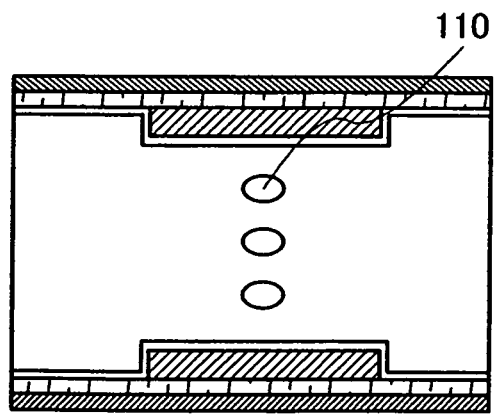

FIGS. 18A and 18B are schematic views of a liquid crystal display device of a monostable mode.

A first substrate 101 is provided with a first electrode layer 103 which is a pixel electrode layer and an insulating layer 105 serving as an alignment film. A second substrate 102 is provided with a second electrode layer 104 which is a counter electrode layer and an insulating layer 106 serving as an alignment film. At least an electrode on a viewing side is formed to transmit light. The first substrate 101 and the second substrate 102 are provided with polarizing plates 107 and 108, respectively, on the opposite sides from liquid crystal. The polarizing plates 107 and 108 are in a cross nicol state.

In a liquid crystal display device having such a structure, application of voltage to the first electrode layer 103 and the second electrode layer 104 (referred to as a vertical electric field type) results in white display, as shown in FIG. 18A. At this time, liquid crystal molecules 100 are aligned horizontally in a direction deviated from the axes (transmission axes or absorption axes) of the polarizing plates (polarizers). Accordingly, light from a backlight can transmit the polarizing plate and a predetermined image is displayed.

When voltage is not applied between the first electrode layer 103 and the second electrode layer 104, black display is performed, as shown in FIG. 18B. At this time, liquid crystal molecules 110 are aligned horizontally in a direction of the axes (the transmission axes or the absorption axes) of the polarizing plates (polarizers). Accordingly, light from a backlight, which transmits the first substrate 101, enters the liquid crystal layer but cannot pass through the second substrate 102, so that black display is performed.

When a color filter is provided, full color display can be performed. Either the first substrate 101 side or the second substrate 102 side can be provided with the color filter.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

As the sealant, a visible light curable resin, a UV curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine-based resin, a heterocyclic epoxy resin, a modified epoxy resin, or the like can be used.

In the case of using PS-FLC in which a UV curable resin is added to smectic liquid crystal, it is preferable that the sealant be formed using a thermosetting resin or a UV curable resin which is cured with light having a wavelength different from a wavelength with which the UV curable resin added to the liquid crystal is cured. The sealant may be cured by either one or both light irradiation and heat treatment.

In FIGS. 1A to 2B, a glass substrate, a quartz substrate, or the like can be used as the first substrate 800 and the second substrate 805. Alternatively, a flexible substrate may be used. A flexible substrate is a substrate that can be bent. For example, besides a plastic substrate made from polycarbonate, polyarylate, polyether sulfone, or the like, a high-molecular material elastomer that exhibits characteristics of an elastic body like rubber at room temperature and can be plasticized to be processed like a plastic at high temperature, and the like can be given. Further alternatively, a film (e.g., a film formed using polypropylene, polyester, vinyl, polyvinyl fluoride, vinyl chloride, or the like) or an inorganic evaporated film can be used.

Each of the first substrate 800 and the second substrate 805 is provided with an electrode layer serving as a pixel electrode layer or a counter electrode layer although they are not shown in FIGS. 1A to 1C. The electrode layer serving as a pixel electrode layer or a counter electrode layer is formed using one or a plurality of the following: indium tin oxide (ITO), indium zinc oxide (IZO) in which zinc oxide (ZnO) is mixed into indium oxide, a conductive material in which silicon oxide ($SiO_2$) is mixed into indium oxide, organic indium, organic tin, indium oxide containing tungsten oxide, indium zinc oxide containing tungsten oxide, indium oxide containing titanium oxide, or indium tin oxide containing titanium oxide; or metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag), or alloy or nitride of any of those metals.

In the case of a transmissive liquid crystal display device, a light transmitting conductive material may be used for the pixel electrode layer and the counter electrode layer. In the case of a reflective liquid crystal display device, a reflective layer may be additionally provided. Alternatively, a reflective conductive material is used for the pixel electrode layer and a light transmitting conductive material is used for the counter electrode layer so that light reflected by the pixel electrode layer passes through the counter electrode layer and is emitted from the viewing side.

In the case of a transmissive liquid crystal display device, a backlight, a sidelight, or the like may be used as a light source. In the case of a reflective liquid crystal display device, a substrate on the viewing side is provided with a polarizing plate. In the case of a transmissive liquid crystal display device, the first substrate and the second substrate are each provided with a polarizing plate with the liquid crystal layer interposed between the first and second substrate provided with polarizing plates. In addition to a polarizing plate, an optical film such as a retardation plate or an anti-reflection film may be provided.

This embodiment mode describes an example in which a sealant is disposed over the first substrate 800, liquid crystal is dropped thereon, and the second substrate is attached to the first substrate 800. In the case of using an element substrate provided with a semiconductor element such as a thin film transistor as the substrate, the sealant may be disposed over the element substrate and liquid crystal may be dropped to the element substrate, or the sealant may be disposed over a counter substrate provided with a color filter, a black matrix, and the like and liquid crystal may be dropped to the counter substrate. Accordingly, the first substrate 800 may be the element substrate and the second substrate 805 may be the counter substrate, or the first substrate 800 may be the counter substrate and the second substrate 805 may be the element substrate.

The pixel electrode layer, the counter electrode layer, the insulating layer, and the like are formed by forming thin films by a sputtering method, a vacuum deposition method, a physical vapor deposition (PVD) method, a chemical vapor deposition (CVD) method such as a low-pressure CVD (LPCVD) method or a plasma CVD method, then etching the thin films into desired shapes. Alternatively, a droplet discharge method by which a pattern can be formed selectively, a printing method (a method such as a screen printing method, offset printing, or the like by which a pattern is formed) by which a pattern can be transferred or drawn, a coating method such as a spin coating method or the like, a dipping method, a dispenser method, a brush application method, a spraying method, a flow-coat method, or the like can be used. Further alternatively, imprinting technology or nanoimprinting technology by which a three-dimensional structure can be formed at the nanometer level using a transfer printing technique can be used. Imprinting and nanoimprinting are technologies by which a minute dimensional structure can be formed without using a photolithography process.

According to this embodiment mode, a liquid crystal display device including a uniform liquid crystal layer in which alignment disorder of liquid crystal molecules, which is caused in manufacturing steps, can be prevented and liquid crystal molecules are aligned with high accuracy can be formed. Further, smectic liquid crystal capable of high speed response can be used for forming a liquid crystal layer with reduced display defects. Accordingly, a liquid crystal display device with improved performance and image quality can be manufactured with high yield according to the present invention.

Embodiment Mode 2

This embodiment mode describes an example of a liquid crystal display device including a uniform liquid crystal layer in which alignment disorder of liquid crystal molecules is prevented and liquid crystal molecules are aligned with high accuracy in order to achieve improved performance and image quality. In specific, a passive matrix liquid crystal display device is described.

Figure 5A:
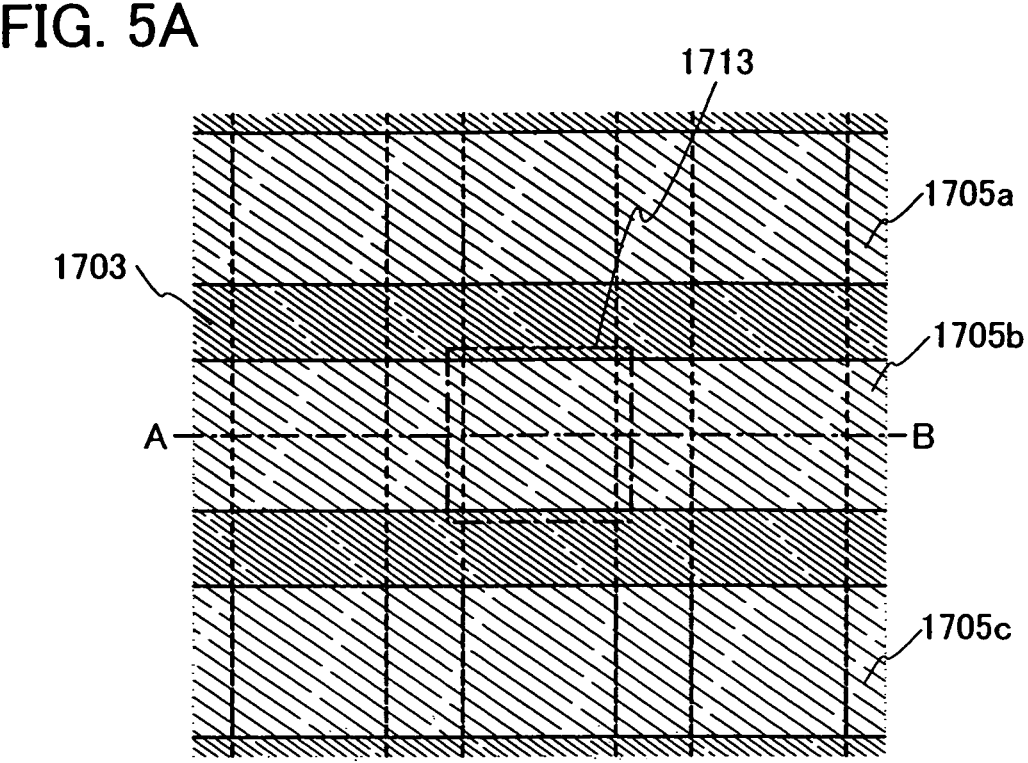
FIG. 5A is a top view and FIG. 5B is a cross-sectional view illustrating a liquid crystal display device according to an aspect of the present invention.
Figure 5B:
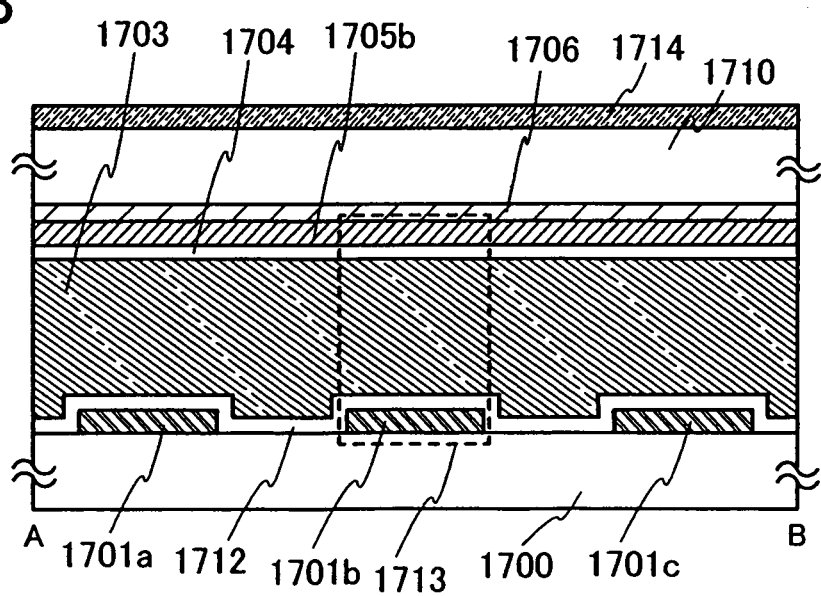

A passive matrix liquid crystal display device of this embodiment mode to which the present invention is applied is described. FIG. 5A shows a top view of the liquid crystal display device and FIG. 5B shows a cross-sectional view taken along line A-B in FIG. 5A. Note that in FIG. 5A, an insulating layer 1704 serving as an alignment film, a coloring layer, a substrate 1710 serving as a counter substrate, a polarizing plate 1714, and the like are provided as shown in FIG. 5B, although they are omitted and not shown in FIG. 5A.

In FIGS. 5A and 5B, a substrate 1700 provided with pixel electrode layers 1701a, 1701b, and 1701c which extend in a first direction, and an insulating layer 1712 serving as an alignment film, and a substrate 1710 provided with an insulating layer 1704 serving as an alignment film, counter electrode layers 1705a, 1705b, and 1705c which extend in a second direction perpendicular to the first direction, a coloring layer 1706 serving as a color filter, and a polarizing plate 1714 are opposed to each other with a liquid crystal layer 1703 therebetween (see FIGS. 5A and 5B). An alignment film refers to an insulating layer in which molecules at its surface are made aligned by rubbing treatment or the like. Note that a reference number 1713 denotes a display element.

The liquid crystal layer 1703 is formed by dropping smectic liquid crystal by a dropping method similar to that of Embodiment Mode 1, according to the present invention. A plurality of droplets of smectic liquid crystal are dropped into a region surrounded by a seal pattern of a sealant over the insulating layer (the insulating layer 1712 or the insulating layer 1704) serving as an alignment film which is formed over the substrate (the substrate 1700 or the substrate 1710) so that the droplets are aligned in a line which is parallel to the rubbing direction of the insulating layer.

The droplets of smectic liquid crystal are dropped. Then the droplets quickly spread in a direction perpendicular to the rubbing direction over the insulating layer (the insulating layer 1712 or the insulating layer 1704) serving as an alignment film when the pair of substrates (the substrate 1700 and the substrate 1710) are attached to each other. This is because smectic liquid crystal is liquid crystal which has a layer structure and a layer direction (a direction in which layers are formed with alignment of liquid crystal molecules) is perpendicular to the rubbing direction. Accordingly, the liquid crystal fills the seal pattern of the sealant to form the liquid crystal layer 1703 when droplets of the liquid crystal are dropped to be aligned in a direction parallel to the rubbing direction of the insulating layer (the insulating layer 1712 and the insulating layer 1704) serving as an alignment film. According to the present invention, when the liquid crystal spreads to fill the seal pattern of the sealant, a bubble does not get into the liquid crystal and collision traces of the droplets do not remain, so that alignment disorder of liquid crystal molecules due to a bubble and or collision of the droplets can be prevented. Accordingly, the uniform liquid crystal layer 1703 of smectic liquid crystal in which alignment disorder of the liquid crystal molecules is caused in manufacturing steps can be prevented and liquid crystal molecules are aligned with high accuracy can be formed.

After the substrate 1700 and the substrate 1710 are attached to each other with the liquid crystal layer 1703 filling the seal pattern of the sealant, it is preferable that the sealant be cured and heat treatment be performed. By heat treatment, alignment disorder of the liquid crystal molecules can be further corrected. Note that such an attaching step is preferably performed under reduced pressure.

Examples of smectic liquid crystal which can be used in this embodiment mode are ferroelectric liquid crystal (FLC), and antiferroelectric liquid crystal (AFLC). Further, a UV curable resin may be added to smectic liquid crystal. For example, a polymer stabilized ferroelectric liquid crystal (PS-FLC) in which a UV curable resin is added to ferroelectric liquid crystal can be used.

A mode which is used in a liquid crystal display device of the present invention may be either a bistable mode or a monostable mode. An example of the bistable mode is a surface stabilized (SS)-FLC mode, and an example of the monostable mode is a V-FLC mode and a half V (HV)-FLC mode. As the V-FLC mode, there are a PS-V-FLC mode and an AFLC mode. As the half V (HV)-FLC mode, there are an FLC mode and a PS-HV-FLC mode.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

As the sealant, a visible light curable resin, a UV curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine-based resin, a heterocyclic epoxy resin, a modified epoxy resin, or the like can be used.

In the case of using PS-FLC in which a UV curable resin is added to smectic liquid crystal, it is preferable that the sealant be formed using a thermosetting resin or a UV curable resin which is cured with light having a wavelength different from a wavelength with which the UV curable resin added to the liquid crystal is cured. The sealant may be cured by either one or both light irradiation and heat treatment.

In the case of using an element substrate provided with a semiconductor element such as a thin film transistor as the substrate, the sealant may be disposed over the element substrate and liquid crystal may be dropped to the element substrate, or the sealant may be disposed over a counter substrate provided with a color filter, a black matrix, and the like and liquid crystal may be dropped to the counter substrate. Accordingly, either the substrate 1700, which is an element substrate, or the substrate 1710, which is a counter substrate, may have a sealant disposed thereover and liquid crystal dropped thereto.

A glass substrate, a quartz substrate, or the like can be used as the substrate 1700 and 1710. Alternatively, a flexible substrate may be used. A flexible substrate is a substrate that can be bent. For example, besides a plastic substrate made from polycarbonate, polyarylate, polyether sulfone, or the like, a high-molecular material elastomer that exhibits characteristics of an elastic body like rubber at room temperature and can be plasticized to be processed like a plastic at high temperature, and the like can be given. Further alternatively, a film (e.g., a film formed using polypropylene, polyester, vinyl, polyvinyl fluoride, vinyl chloride, or the like) or an inorganic evaporated film can be used.

The pixel electrode layers 1701a, 1701b, and 1701c, or a counter electrode layer 1705 is formed using indium tin oxide (ITO), indium zinc oxide (IZO) in which zinc oxide (ZnO) is mixed into indium oxide, a conductive material in which silicon oxide ($SiO_2$) is mixed into indium oxide, organic indium, organic tin, indium oxide containing tungsten oxide, indium zinc oxide containing tungsten oxide, indium oxide containing titanium oxide, or indium tin oxide containing titanium oxide; or metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag), or alloy or nitride of any of those metals.

In the case of a transmissive liquid crystal display device, a light transmitting conductive material may be used for the pixel electrode layers 1701a, 1701b, and 1701c and the counter electrode layer 1705. In the case of a reflective liquid crystal display device, a reflective layer may be additionally provided. Alternatively, a reflective conductive material is used for the pixel electrode layers 1701a, 1701b, and 1701c and a light transmitting conductive material is used for the counter electrode layer 1705 so that light reflected by the pixel electrode layer passes through the counter electrode layer and is emitted from the viewing side.

In the case of a transmissive liquid crystal display device, a backlight, a sidelight, or the like may be used as a light source. Further, in the case of a transmissive liquid crystal display device, a polarizing plate is provided also to the outer side of the substrate 1700.

Note that after a conductive layer, an insulating layer, or the like is formed by discharging a composition by a droplet discharge method, a surface thereof may pressed with pressure to enhance a level of planarity. As a pressing method, concavity and convexity of the surface may be reduced by scanning the surface by a roller-shaped object, or the surface may be pressed perpendicularly by a flat plate-shaped object. Heat treatment may be performed at the time of pressing. Alternatively, concavity and convexity of the surface may be removed with an air knife after the surface is softened or melted with a solvent or the like. Further, a CMP method may be used for polishing the surface. This step can be employed for planarizing the surface when the surface becomes uneven by a droplet discharge method.

According to this embodiment mode, a uniform liquid crystal layer of smectic liquid crystal in which alignment disorder of liquid crystal molecules, which is caused in manufacturing steps, can be prevented and liquid crystal molecules are aligned with high accuracy can be formed. Since smectic liquid crystal like ferroelectric liquid crystal has a high response speed, a liquid crystal display device with a high response speed and reduced display defects can be manufactured by using a liquid crystal layer formed according to the present invention. Therefore, a liquid crystal display device with improved performance and image quality can be manufactured with high yield according to this embodiment mode.

This embodiment mode can be freely combined with foregoing Embodiment Mode 1.

Embodiment Mode 3

This embodiment mode describes an example of a liquid crystal display device including a uniform liquid crystal layer in which alignment disorder of liquid crystal molecules is prevented and liquid crystal molecules are aligned with high accuracy in order to achieve improved performance and image quality. In this embodiment mode, a liquid crystal display device having a structure different from that in Embodiment Mode 2 is described. In specific, an active matrix liquid crystal display device is described.

Figure 6A:
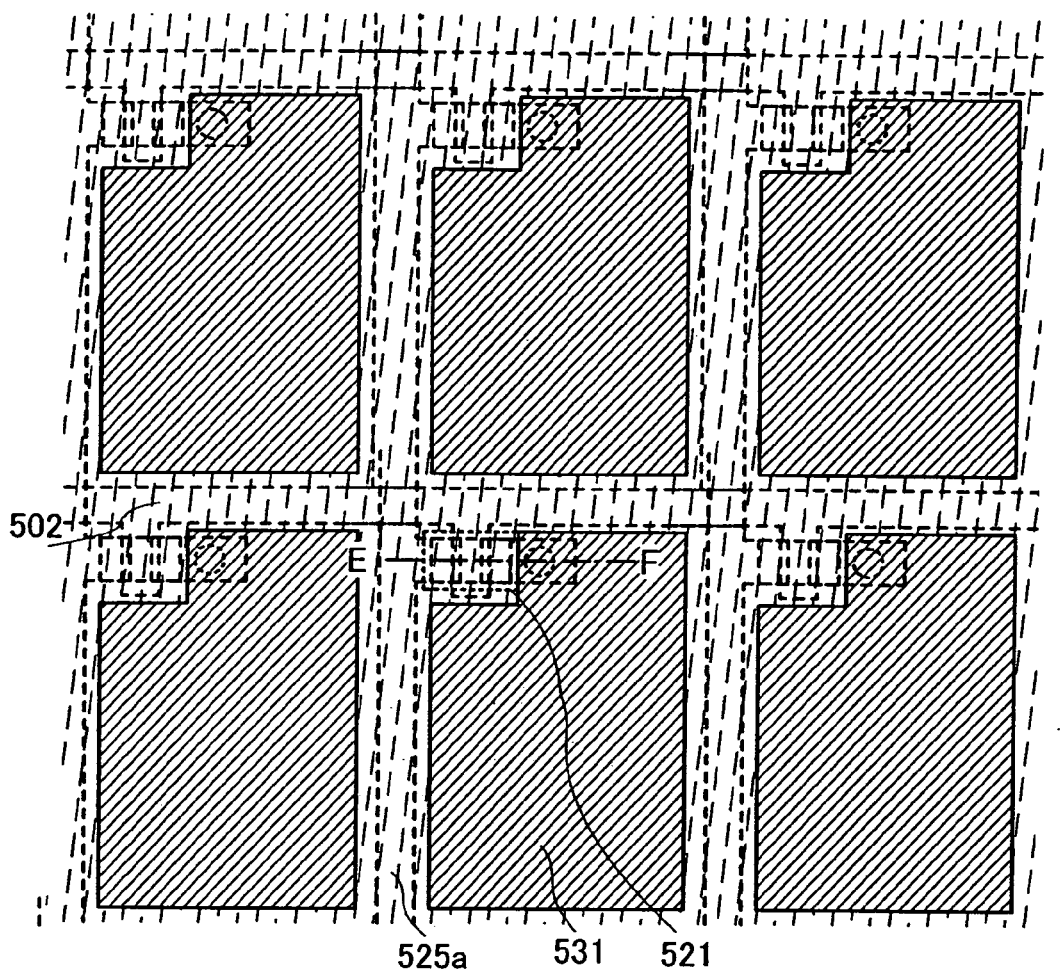
FIG. 6A is a top view and FIG. 6B is a cross-sectional view illustrating a liquid crystal display device according to an aspect of the present invention.
Figure 6B:
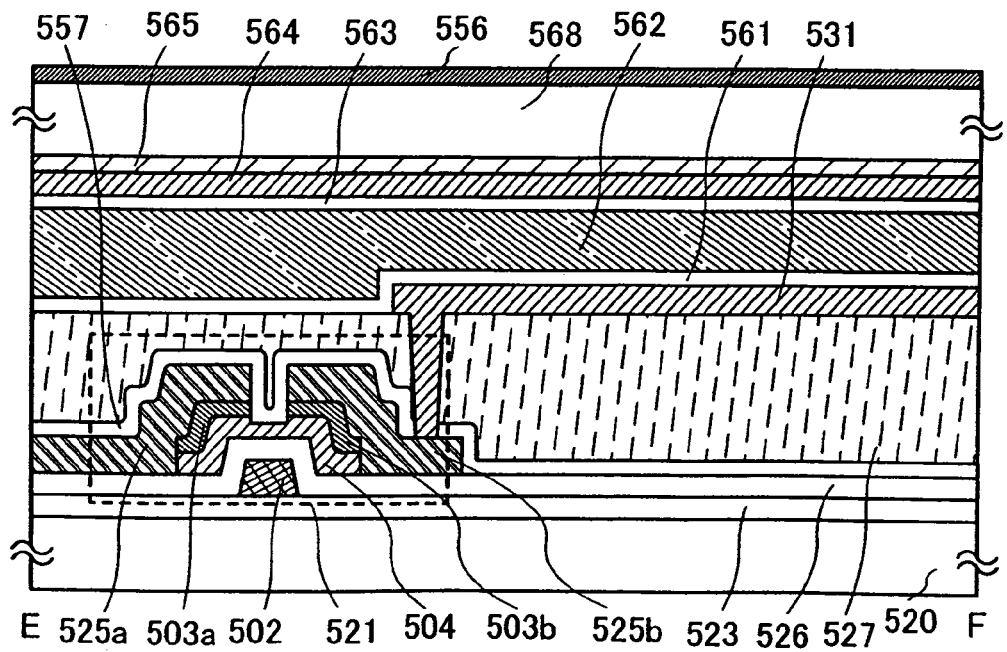

FIG. 6A shows a top view of a liquid crystal display device and FIG. 6B shows a cross-sectional view taken along line E-F in FIG. 6A. Note that in FIG. 6A, a liquid crystal layer, and an alignment film, a counter electrode layer, a coloring layer, and the like, which are provided on the counter substrate side are provided as shown in FIG. 6B although they are omitted and not shown in FIG. 6A.

First wirings which extend in a first direction and second wirings which extend in a second direction perpendicular to the first direction are provided in matrix over a substrate 520 provided with an insulating layer 523 serving as a base film. The first wiring is connected to a source electrode or a drain electrode of a transistor 521 and the second wiring is connected to a gate electrode of the transistor 521. Further, a pixel electrode layer 531 is connected to a wiring layer 525b, which is one of the source electrode or the drain electrode of the transistor 521 which is not connected to the first wiring.

The substrate 520 provided with the transistor 521 which is an inverted staggered TFT, an insulating layer 557, an insulating layer 527, the pixel electrode layer 531, and an insulating layer 561 serving as an alignment film, and a substrate 568 provided with an insulating layer 563 serving as an alignment film, a counter electrode layer 564, a coloring layer 565 serving as a color filter, and a polarizing plate (a layer including a polarizer which may be simply referred to as a polarizer) 556 are opposed to each other with a liquid crystal layer 562 therebetween.

The liquid crystal layer 562 is formed by dropping smectic liquid crystal by a dropping method similar to that of Embodiment Mode 1, according to the present invention. A plurality of droplets of smectic liquid crystal are dropped into a region surrounded by a seal pattern of a sealant over the insulating layer (the insulating layer 561 or the insulating layer 563) serving as an alignment film which is formed over the substrate (the substrate 1700 or the substrate 1710) so that the droplets are aligned in a line which is parallel to the rubbing direction of the insulating layer.

The droplets of smectic liquid crystal are dropped. Then, the droplets are quickly spread in a direction perpendicular to the rubbing direction over the insulating layer (the insulating layer 561 or the insulating layer 563) serving as an alignment film when the pair of substrates (the substrate 520 and the substrate 568) are attached to each other. This is because smectic liquid crystal is liquid crystal which has a layer structure and a layer direction (a direction in which layers are formed with alignment of liquid crystal molecules) is perpendicular to the rubbing direction. Accordingly, the liquid crystal fills the seal pattern of the sealant to form the liquid crystal layer 562 when droplets of the liquid crystal are dropped so as to be aligned in a direction parallel to the rubbing direction of the insulating film (the insulating layer 561 or the insulating layer 563) serving as the alignment film. According to the present invention, when the liquid crystal spreads to fill the seal pattern of the sealant, a bubble does not get into the liquid crystal and collision traces of the droplets do not remain, so that alignment disorder of liquid crystal molecules due to a bubble and or collision of the droplets can be prevented. Accordingly, the uniform liquid crystal layer 562 of smectic liquid crystal in which alignment disorder of liquid crystal molecules, which is caused in manufacturing steps, can be prevented and the liquid crystal molecules are aligned with high accuracy can be formed.

After the substrate 520 and the substrate 568 are attached to each other with the liquid crystal layer 562 filling the seal pattern of the sealant, it is preferable that the sealant be cured and heat treatment be performed. By heat treatment, alignment disorder of the liquid crystal molecules can be further corrected. Note that the attaching step is preferably performed under reduced pressure.

Examples of smectic liquid crystal which can be used in this embodiment mode are ferroelectric liquid crystal (FLC), and antiferroelectric liquid crystal (AFLC). Further, a UV curable resin may be added to smectic liquid crystal. For example, a polymer stabilized ferroelectric liquid crystal (PS-FLC) in which a UV curable resin is added to ferroelectric liquid crystal can be used.

A mode which is used in a liquid crystal display device of the present invention may be either a bistable mode or a monostable mode. An example of the bistable mode is a surface stabilized (SS)-FLC mode, and an example of the monostable mode is a V-FLC mode and a half V (HV)-FLC mode. As the V-FLC mode, there are a PS-V-FLC mode and an AFLC mode. As the half V (HV)-FLC mode, there are an FLC mode and a PS-HV-FLC mode.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

As the sealant, a visible light curable resin, a UV curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine-based resin, a heterocyclic epoxy resin, a modified epoxy resin, or the like can be used.

In the case of using PS-FLC in which a UV curable resin is added to smectic liquid crystal, it is preferable that the sealant be formed using a thermosetting resin or a UV curable resin which is cured with light having a wavelength different from a wavelength with which the UV curable resin added to the liquid crystal is cured. The sealant may be cured by either one or both light irradiation and heat treatment.

In the case of using an element substrate provided with a semiconductor element such as a thin film transistor as the substrate, the sealant may be disposed over the element substrate and liquid crystal may be dropped to the element substrate, or the sealant may be disposed over a counter substrate provided with a color filter, a black matrix, and the like and liquid crystal may be dropped to the counter substrate. Accordingly, either the substrate 520, which is an element substrate, or the substrate 568, which is a counter substrate, may have a sealant disposed thereover and liquid crystal dropped thereto.

FIGS. 6A and 6B in this embodiment mode show an example in which the transistor 521 is a channel-etch inverted staggered transistor. In FIGS. 6A and 6B, the transistor 521 includes a gate electrode layer 502, a gate insulating layer 526, a semiconductor layer 504, semiconductor layers 503a and 503b having one conductivity type, and wiring layers 525a and 525b which are source electrode layer and a drain electrode layer.

Figure 7:
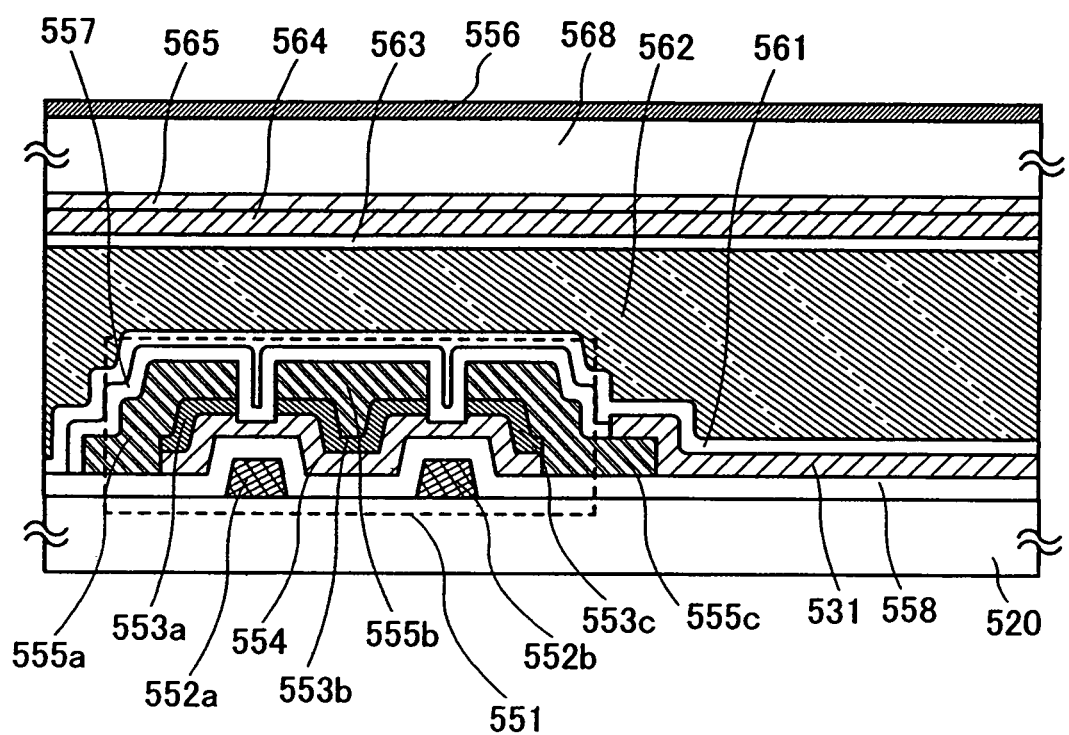
FIG. 7 is a cross-sectional view illustrating a liquid crystal display device according to an aspect of the present invention.

FIG. 7 shows an example in which a multigate transistor is used. In FIG. 7, the substrate 520 provided with a transistor 551 which is a multigate transistor, the pixel electrode layer 531, and the insulating layer 561 serving as an alignment film, and the substrate 568 provided with the insulating layer 563 serving as an alignment film, the counter electrode layer 564, the coloring layer 565 serving as a color filter, and the polarizing plate (a layer including a polarizer which may be simply referred to as a polarizer) 556 are opposed to each other with the liquid crystal layer 562 therebetween.

In FIG. 7, the polarizing plate 556 is provided to an outer side of the substrate 568 which is a counter substrate. The polarizing plate, the color filter, and the like may be provided to an inner side of the substrate or to an outer side of the substrate. While the liquid crystal display device in FIG. 7 describes an example in which the polarizing plate 556 is provided to the outer side of the substrate 568 and the coloring layer 565 and the counter electrode layer 564 are provided in that order to the inner side of the substrate 568, the stacked-layers structure of the polarizing plate and the coloring layer is not limited to FIG. 7. The stacked-layers structure may be set as appropriate depending on a material and manufacturing steps of the polarizing plate and the coloring layer. Further, since the liquid crystal display device in FIG. 7 is a reflective liquid crystal display device, one polarizing plate is provided on the counter substrate side which is a viewing side. In the case of the transmissive liquid crystal display device, the element substrate and the counter substrate are each provided with a polarizing plate so that the liquid crystal layer is interposed between the polarizing plates. Further, a retardation plate or the like may be provided between the polarizing plate and the alignment film, and an optical film such as an anti-reflection film can be provided on the outermost viewing side surface of the liquid crystal display device.

The transistor 551 is an example of a multigate channel-etch inverted staggered transistor. In FIG. 7, the transistor 551 includes a gate electrode layers 552a and 552b, the gate insulating layer 558, a semiconductor layer 554, semiconductor layers 553a, 553b, and 553c having one conductivity type, and wiring layers 555a, 555b, and 555c which are source electrode layers or drain electrode layers. The insulating layer 557 is provided over the transistor 551.

The semiconductor layer can be formed using the following material: an amorphous semiconductor (hereinafter also referred to as an AS) manufactured by a vapor-phase growth method using a semiconductor material gas typified by silane or germane or a sputtering method, a polycrystalline semiconductor formed by crystallizing the amorphous semiconductor by utilizing light energy or thermal energy, a single crystal semiconductor, or the like.

The amorphous semiconductor is typified by hydrogenated amorphous silicon, and the crystalline semiconductor is typified by polysilicon or the like. Polysilicon (polycrystalline silicon) includes so-called high-temperature polysilicon which contains polysilicon formed at a process temperature of 800° C. or higher as its main component, so-called low-temperature polysilicon which contains polysilicon formed at a process temperature of 600° C. or lower as its main component, and polysilicon formed by crystallizing amorphous silicon by using an element or the like which promotes crystallization. Instead of such a thin film process, an SOI substrate having an insulating surface provided with a single crystal semiconductor layer may be used. The SOI substrate can be formed by a separation by implanted oxygen (SIMOX) method or a smart-cut method. In a SIMOX method, after oxygen ions are implanted into a single crystal silicon substrate to form a layer containing oxygen in a given depth, heat treatment is performed, an embedded insulating layer is formed in a given depth from the surface of the single crystal silicon substrate, and a single crystal silicon layer is formed on the embedded insulating layer. In the smart-cut method, hydrogen ions are implanted into an oxidized single crystal silicon substrate to form a layer containing hydrogen in a desired depth, the oxidized single crystalline silicon substrate is attached to another supporting substrate (e.g., a single crystal silicon substrate having a surface provided with a silicon oxide film for bonding), and heat treatment is performed, whereby the single crystal silicon substrate is separated at the layer containing hydrogen to form stacked layers of the silicon oxide film and the single crystal silicon layer over the supporting substrate.

In a case where a crystalline semiconductor layer is used as the semiconductor film, the crystalline semiconductor layer may be manufactured by using various methods (e.g., a laser crystallization method, a thermal crystallization method, or a thermal crystallization method using an element which promotes crystallization such as nickel). A microcrystalline semiconductor can be crystallized by laser light irradiation to improve crystallinity. In a case where the element which promotes crystallization of an amorphous semiconductor layer is not introduced, hydrogen is released until the concentration of hydrogen contained in the amorphous semiconductor film becomes $1 \times 10^{20}$ atoms/cm$^3$ or less by heating the amorphous silicon layer at a temperature of 500° C. for one hour in a nitrogen atmosphere before laser light irradiation. This is because the amorphous semiconductor layer containing much hydrogen is damaged if the amorphous semiconductor layer is irradiated with laser light. Heat treatment for crystallization can be performed using a heating furnace, laser irradiation, irradiation with light emitted from a lamp (also referred to as lamp annealing), or the like. An example of a heating method is an RTA method such as a gas rapid thermal annealing (GRTA) method or a lamp rapid thermal annealing (LRTA) method. GRTA is a method for performing heat treatment using a high-temperature gas, and LRTA is a method for performing heat treatment by using lamp light.

Crystallization may be performed by adding an element which promotes crystallization (also referred to as a catalyst element or a metal element) to an amorphous semiconductor layer and performing heat treatment (at 550° C. to 750° C. for 3 minutes to 24 hours) in a crystallization step in which an amorphous semiconductor layer is crystallized to form a crystalline semiconductor layer. As the element which promotes crystallization, one or more elements selected from iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

Any method can be used to introduce a metal element into the amorphous semiconductor layer as long as the method is capable of making the metal element exist on the surface or inside of the amorphous semiconductor layer. For example, a sputtering method, a CVD method, a plasma treatment method (including a plasma CVD method), an adsorption method, or a method in which a metal salt solution is applied can be employed. Among them, the method using a solution is simple and easy, and advantageous in terms of easy concentration control of the metal element. In such a method, it is preferable to form an oxide film by irradiation with UV light in an oxygen atmosphere, a thermal oxidation method, a treatment with ozone water or hydrogen peroxide including a hydroxyl radical, or the like in order to improve wettability of the surface of the amorphous semiconductor layer to spread an aqueous solution across the entire surface of the amorphous semiconductor layer.

In order to remove or reduce the element which promotes crystallization from the crystalline semiconductor layer or reduce the element, a semiconductor layer containing an impurity element is formed in contact with the crystalline semiconductor layer, which functions as a gettering sink. The impurity element can be an impurity element imparting n-type conductivity, an impurity element imparting p-type conductivity, a noble gas element, or the like. For example, one or more elements selected from phosphorus (P), nitrogen (N), arsenic (As), antimony (Sb), bismuth (Bi), boron (B), helium (He), neon (Ne), argon (Ar), krypton (Kr), and xenon (Xe) can be used. A semiconductor layer containing a noble gas element is formed on the crystalline semiconductor layer containing an element which promotes crystallization, and heat treatment (at 550° C. to 750° C. for 3 minutes to 24 hours) is performed. The element which promotes crystallization in the crystalline semiconductor layer moves into the semiconductor layer containing a noble gas element; thus, the element which promotes crystallization in the crystalline semiconductor layer is removed or reduced. After that, the semiconductor layer containing a noble gas element, which serves as a gettering sink, is removed.

Laser irradiation can be performed by relatively moving a laser beam and the semiconductor layer. In laser irradiation, markers can be formed in order to overlap a beam with high accuracy or to control a start position or an end position of laser irradiation. The marker may be formed over the substrate at the same time as the formation of the amorphous semiconductor film.

In a case of using laser irradiation, a continuous-wave laser beam (CW laser beam) or a pulsed laser beam can be used. An applicable laser beam is a beam emitted from one or more kinds of the following lasers: a gas laser such as an Ar laser, a Kr laser, or an excimer laser; a laser using, as a medium, single crystal YAG, YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$, to which one or more of Nd, Yb, Cr, Ti, Ho, Er, Tm, and Ta is added as a dopant; a glass laser; a ruby laser; an alexandrite laser; a Ti:sapphire laser; a copper vapor laser; and a gold vapor laser. A crystal having a large grain diameter can be obtained by irradiation with the fundamental wave of any of the above laser beam or the second harmonic to the fourth harmonic of the fundamental wave thereof. For example, the second harmonic (532 nm) or the third harmonic (355 nm) of a Nd:YVO$_4$ laser (the fundamental wave: 1064 nm) can be used. This laser can emit either a CW laser beam or a pulsed laser beam. When the laser emits a CW laser beam, a power density of the laser needs to be about 0.01 MW/cm$^2$ to 100 MW/cm$^2$ (preferably, 0.1 MW/cm$^2$ to 10 MW/cm$^2$). A scanning rate for irradiation is about 10 cm/sec to 2000 cm/sec.

Note that the laser using, as a medium, single crystal YAG, YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$, to which one or more of Nd, Yb, Cr, Ti, Ho, Er, Tm, and Ta is added as a dopant; an Ar ion laser; or a Ti:sapphire laser can be used as a CW laser, whereas they can also be used as pulsed laser with a repetition rate of 10 MHz or more by being combined with a Q-switch operation, mode locking, or the like. When a laser beam is oscillated at a repetition rate of 10 MHz or more, the semiconductor layer is irradiated with a pulsed laser beam after being melted by a preceding laser beam and before being solidified. Therefore, unlike the case of using a pulsed laser with a low repetition rate, a solid-liquid interface can be moved continuously in the semiconductor layer, so that crystal grains grown continuously in the scanning direction can be obtained.

When ceramic (polycrystal) is used as a medium, the medium can be formed into a desired shape in a short time at low cost. In the case of using a single crystal, a columnar medium having a diameter of several millimeters and a length of several tens of millimeters is generally used. In the case of using ceramic, a larger medium can be formed.

A concentration of a dopant such as Nd or Yb in a medium, which directly contributes to light emission, cannot be changed largely either in a single crystal or in a polycrystal. Therefore, there is limitation to some extent on improvement in laser output by increasing the concentration. However, in the case of using ceramic, the size of the medium can be significantly increased compared with the case of using a single crystal, and thus, significant improvement in output can be achieved.

Furthermore, in the case of using ceramic, a medium having a parallelepiped shape or a rectangular solid shape can be easily formed. When a medium having such a shape is used and emitted light propagates inside the medium in zigzag, the light path can be extended. Therefore, the light is amplified largely and can be emitted with high output. In addition, since a laser beam emitted from a medium having such a shape has a quadrangular shape in cross-section at the time of emission, it has an advantage over a circular beam in being shaped into a linear beam. By shaping the laser beam emitted as described above using an optical system, a linear beam having a length of 1 mm or less on a shorter side and a length of several millimeters to several meters on a longer side can be easily obtained. Further, by uniformly irradiating the medium with excited light, the linear beam has a uniform energy distribution in a long-side direction. Moreover, the semiconductor film is preferably irradiated with the laser beam at an incident angle $\theta$ ($0°<\theta<90°$) to prevent laser interference.

By irradiating the semiconductor film with this linear beam, the entire surface of the semiconductor film can be annealed more uniformly. When uniform annealing is necessary, it is necessary to exercise ingenuity such as providing slits so as to block light at a portion where energy is attenuated.

When the linear beam with uniform intensity which is obtained as described above is used for annealing the semiconductor film and a display device is manufactured using this semiconductor film, the display device have favorable and uniform characteristics.

The laser light irradiation may be performed in an inert gas atmosphere such as a rare gas or nitrogen. This can suppress surface roughness of the semiconductor film due to laser light irradiation and variation of threshold value which is caused by variation of interface state density.

The amorphous semiconductor film may be crystallized by a combination of heat treatment and laser light irradiation, or several times of either heat treatment or laser light irradiation.

The gate electrode layer can be formed by a sputtering method, an evaporation method, a CVD method, or the like. The gate electrode layer may be formed using an element selected from tantalum (Ta), tungsten (W), titanium (Ti), molybdenum (Mo), aluminum (Al), copper (Cu), chromium (Cr), and neodymium (Nd) or an alloy or compound material containing any of those elements as its main component. Alternatively, the gate electrode layer may be formed using an AgPdCu alloy or a semiconductor film typified by a polycrystalline silicon film doped with an impurity element such as phosphorus. The gate electrode layer may be a single layer or stacked layers.

While the gate electrode layer is formed in a tapered shape in this embodiment mode, the present invention is not limited thereto. The gate electrode layer may have a stacked-layers structure, in which only one layer may have a tapered shape and the other layer may have a perpendicular side surface which is formed by anisotropic etching. The layers included in the gate electrode layer may have different taper angles or the same taper angle. When the gate electrode layer has a tapered shape, the coverage thereof with a film to be stacked thereover is improved, and defects can be reduced. Accordingly, reliability is improved.

The source electrode layer or the drain electrode layer can be formed by forming a conductive film by a sputtering method, a PVD method, a CVD method, an evaporation method, or the like and then etching the conductive film into a desired shape. Alternatively, a conductive layer can be selectively formed in a desired position by a droplet discharge method, a printing method, a dispenser method, an electroplating method, or the like. Still alternatively, a reflow method or a damascene method may be used. A material of the source electrode layer or the drain electrode layer can be a conductive material such as metal, e.g., Ag, Au, Cu, Ni, Pt, Pd, Ir, Rh, W, Al, Ta, Mo, Cd, Zn, Fe, Ti, Zr, Ba, Si, or Ge or an alloy or a nitride of any of those elements. A stacked-layers structure thereof may be used.

The insulating layers 523, 526, 557, 558, and 527 may be formed using an inorganic insulating material such as silicon oxide, silicon nitride, silicon oxynitride, aluminum oxide, aluminum nitride, or aluminum oxynitride; an acrylic acid, a methacrylic acid, or a derivative thereof; a heat resistant high molecular compound such as polyimide, aromatic polyamide, or polybenzimidazole; or a siloxane resin. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. Further, an organic material such as benzocyclobutene, fluorinated arylene ether, or polyimide, a composition material containing a water-soluble homopolymer and a water-soluble copolymer, or the like may be used. The insulating layers 523, 526, 557, 558, and 527 can be formed by a vapor-phase growth method such as a plasma CVD method or a thermal CVD method, or a sputtering method. Alternatively, they can be formed by a droplet discharge method or a printing method (a screen printing or offset printing by which a pattern is formed). A film obtained by a coating method, an SOG film, or the like can alternatively is used.

The structure of the thin film transistor used in the present invention is not limited to the structure described in this embodiment mode, and the thin film transistor may have a single gate structure in which a single channel formation region is formed, a double gate structure in which two channel formation regions are formed, or a triple gate structure in which three channel formation regions are formed. Further, a thin film transistor in a peripheral driver circuit region may also have a single gate structure, a double gate structure, or a triple gate structure.

Note that without limitation to the method for manufacturing a thin film transistor which is described in this embodiment mode, the present invention can employ a top gate structure (e.g., a staggered structure or a coplanar structure), a bottom gate structure (e.g., an inverted coplanar structure), a dual gate structure including two gate electrode layers provided over and under a channel region each with a gate insulating film interposed therebetween, or other structures.

The transistor may have any structure, as long as the transistor can serve as a switching element. The semiconductor layer may be formed using various semiconductors such as an amorphous semiconductor, a crystalline semiconductor, a polycrystalline semiconductor, and a microcrystalline semiconductor. An organic transistor may be formed using an organic compound.

According to this embodiment mode, a uniform liquid crystal layer of smectic liquid crystal in which alignment disorder of liquid crystal molecules, which is caused in manufacturing steps, can be prevented and liquid crystal molecules are aligned with high accuracy can be formed. Since smectic liquid crystal like ferroelectric liquid crystal has a high response speed, a liquid crystal display device with a high response speed and reduced display defects can be manufactured by using a liquid crystal layer formed according to the present invention. Therefore, a liquid crystal display device with improved performance and image quality can be manufactured with high yield according to this embodiment mode.

This embodiment mode can be freely combined with foregoing Embodiment Mode 1.

Embodiment Mode 4

This embodiment mode describes an example of a liquid crystal display device including a uniform liquid crystal layer in which alignment disorder of liquid crystal molecules is prevented and liquid crystal molecules are aligned with high accuracy in order to achieve improved performance and image quality. In specific, a liquid crystal display device according to the present invention which includes a thin film transistor having a crystalline semiconductor film is described.

Figure 12A:
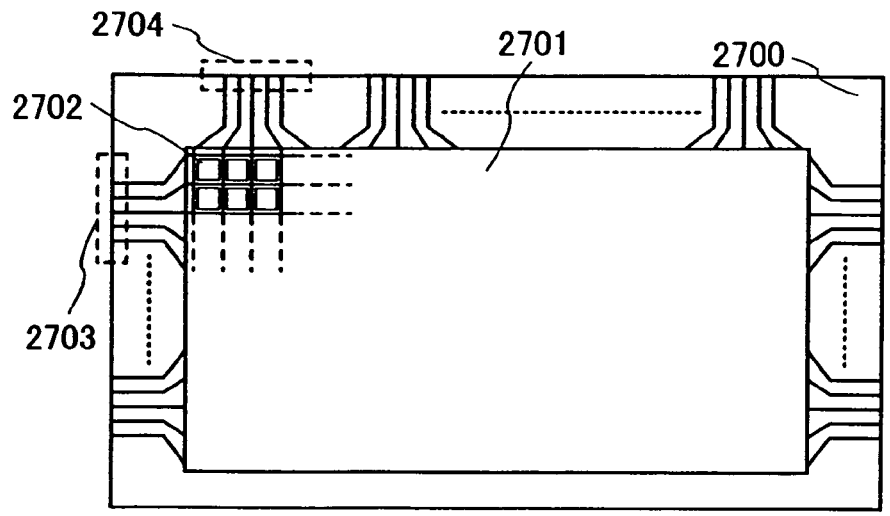
FIGS. 12A to 12C are top views illustrating a liquid crystal display device according to an aspect of the present invention.

FIG. 12A shows a top view of a structure of a display panel according to the present invention. A pixel portion 2701 in which pixels 2702 are arranged in matrix, a scanning line input terminal 2703, and a signal line input terminal 2704 are formed over a substrate 2700 having an insulating surface. The number of pixels may be set in accordance with various standards. In the case of XGA and full color display using RGB, the number of pixels may be 1024×768×3 (RGB). In the case of UXGA and full color display using RGB, the number of pixels may be 1600×1200×3 (RGB). In the case of full-spec high-definition display using RGB, the number of pixels may be 1920×1080×3 (RGB).

The pixels 2702 are arranged in matrix by being provided at intersections of scanning lines extended from the scanning line input terminal 2703 and signal lines extended from the signal line input terminal 2704. Each pixel in the pixel portion 2701 includes a switching element and a pixel electrode layer connected thereto. A typical example of a switching element is a TFT. A TFT has a gate electrode layer side connected to the scanning line and a source or drain electrode layer side connected to the signal line, so that each pixel can be controlled independently by a signal inputted from an external portion.

Figure 13A:
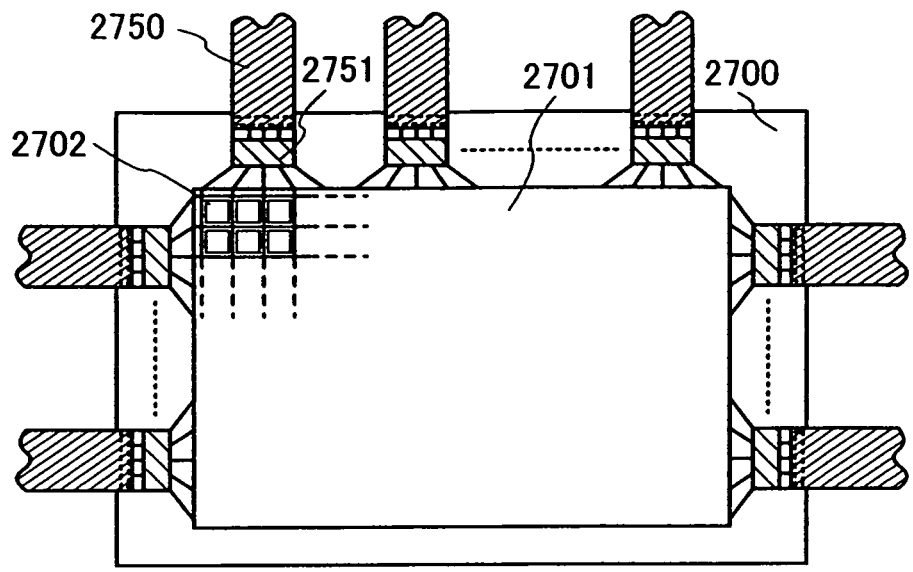
FIGS. 13A and 13B are top views illustrating a liquid crystal display device according to an aspect of the present invention.
Figure 13B:
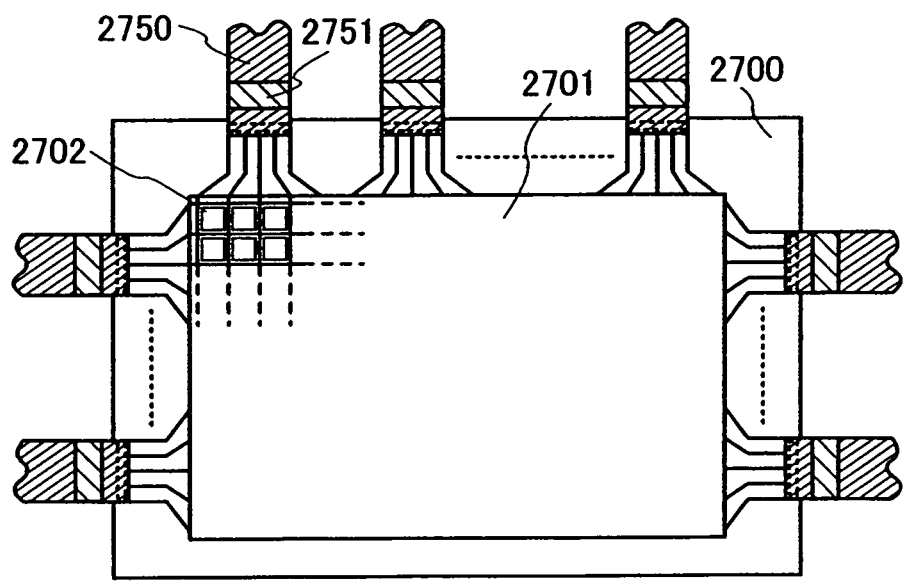

Although FIG. 12A shows a structure of a display panel in which signals inputted to the scanning line and the signal line are controlled by an external driver circuit, a driver IC 2751 may be mounted over the substrate 2700 by a chip on glass (COG) method, as shown in FIG. 13A. Alternatively, a tape automated bonding (TAB) method shown in FIG. 13B may be employed. The driver IC may be one formed using a single crystal semiconductor substrate or may be a circuit that is formed using a TFT over a glass substrate. In FIGS. 13A and 13B, the driver IC 2751 is connected to a flexible printed circuit (FPC) 2750.

Figure 12B:
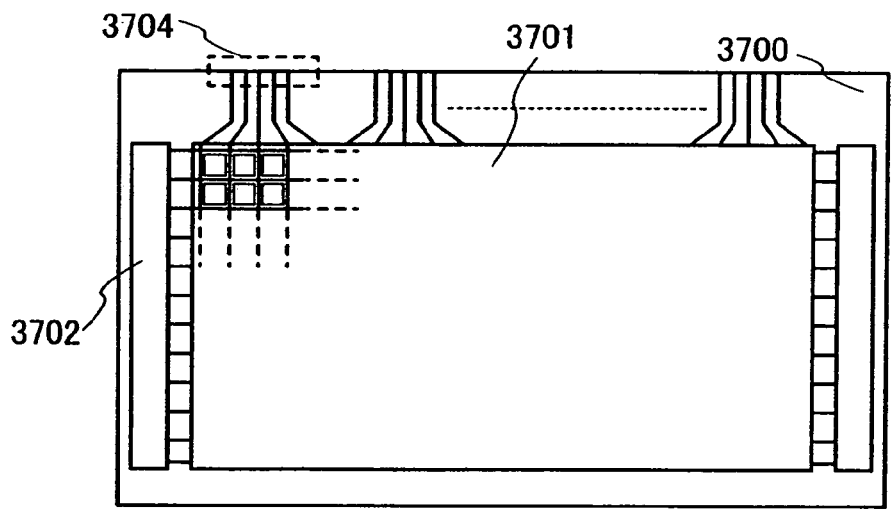
Figure 12C:
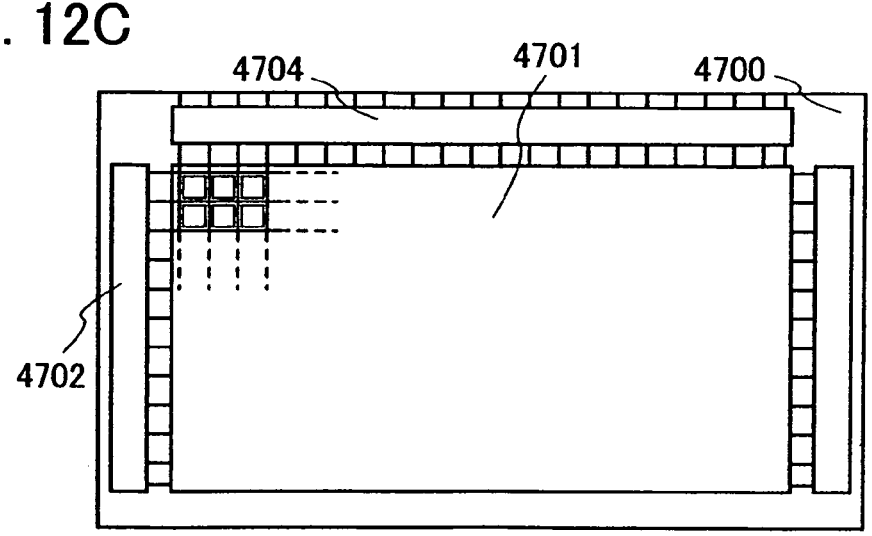

In the case of forming a TFT provided in a pixel using a crystalline semiconductor, a scanning line driver circuit 3702 can also be formed over a substrate 3700, as shown in FIG. 12B. In FIG. 12B, a pixel portion 3701 is controlled by an external driver circuit connected to a signal line input terminal 3704, similarly to FIG. 12A. In the case where the TFT provided in the pixel is formed using a polycrystalline (microcrystalline) semiconductor, a single crystal semiconductor, or the like with high mobility, a pixel portion 4701, a scan line driver circuit 4702, and a signal line driver circuit 4704 can all be formed over a substrate 4700, as shown in FIG. 12C.

Figure 8A:
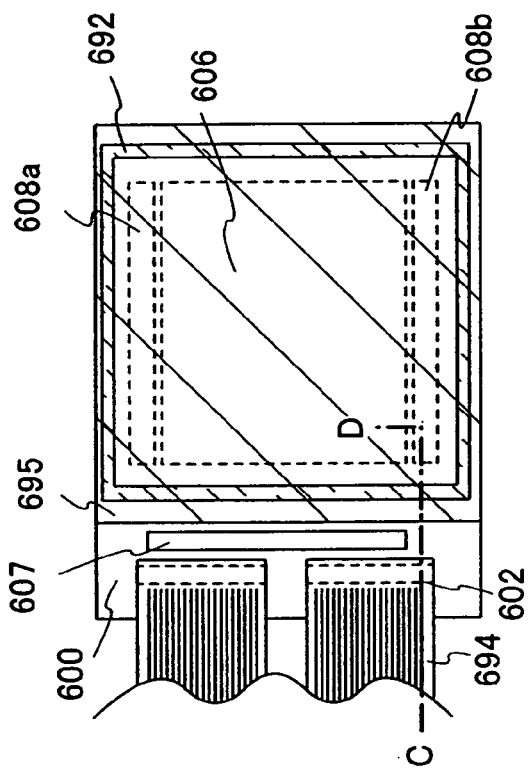
FIG. 8A is a top view and FIG. 8B is a cross-sectional view illustrating a liquid crystal display device according to an aspect of the present invention.
Figure 8B:
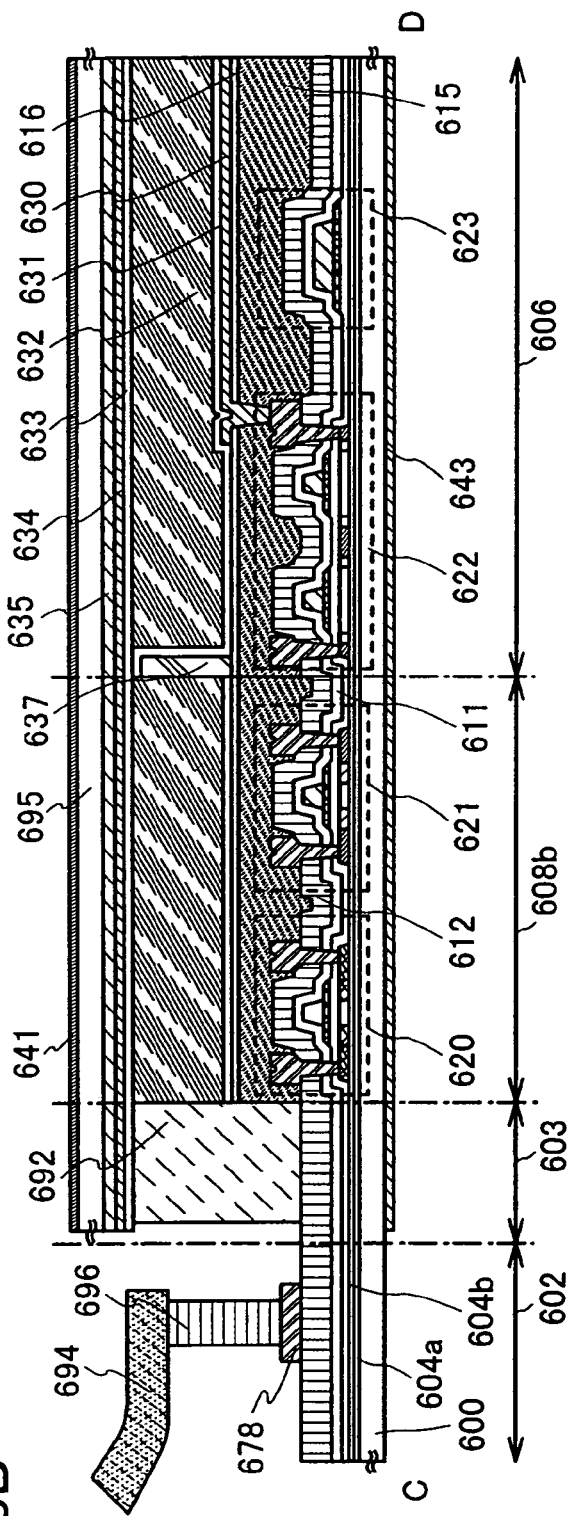

FIG. 8A shows a top view of the liquid crystal display device of this embodiment mode according to the present invention and FIG. 8B shows a cross-sectional view taken along line C-D in FIG. 8A.

As shown in FIGS. 8A and 8B, a pixel region 606, a driver circuit region 608a which is a scanning line driver circuit, and a driver circuit region 608b that is a scanning line driver region are sealed between a substrate 600 which is an element substrate and a substrate 695 which is a counter substrate with a sealant 692. A drive circuit region 607 which is a signal line driver circuit formed using a driver IC is provided over the substrate 600. In the pixel region 606, a transistor 622 and a capacitor 623 are provided, and in the drive circuit region 608b, a drive circuit including a transistor 620 and a transistor 621 is provided.

The substrate 600 and the substrate 695 are insulating substrates with a light-transmitting property (hereinafter also referred to as a light-transmitting substrate). The substrate particularly transmits light in a wavelength region of visible light. For example, a glass substrate such as a barium borosilicate glass or aluminoborosilicate glass, or a quartz substrate can be used. Alternatively, a substrate formed from plastics typified by polyethylene terephthalate (PET), polyethylene naphthalate (PEN), polyethersulfone (PES), and polycarbonate (PC); or a substrate formed from a flexible synthetic resin such as acrylic can be employed. Further alternatively, a film (formed from polypropylene, polyester, vinyl, polyvinyl fluoride, or vinyl chloride), a base film (formed from polyester, polyamide, or an inorganic evaporated film), and the like may be used. Although there is a concern that a substrate formed from a synthetic resin generally has a low heat-resistance temperature compared to other kinds of substrates in general, the substrate formed from a synthetic resin can be used when a manufacturing process is carried out with a substrate with high heat resistance and then the substrate with high heat resistance is replaced with the substrate formed from a synthetic resin.

In the pixel region 606, the transistor 622 serving as a switching element is provided over the substrate 600 with a base film 604a and a base film 604b interposed therebetween.

A material for the base films 604a and 604b may be an acrylic acid, a methacrylic acid, or a derivative thereof; a heat resistant high molecular compound such as polyimide, aromatic polyamide, or polybenzimidazole; or a siloxane resin. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. Further, an organic material such as benzocyclobutene, parylene, fluorinated arylene ether, or polyimide, a composition material containing a water-soluble homopolymer and a water-soluble copolymer, or the like may be used. Further, an oxazole resin, for example, a photocuring polybenzoxazole or the like can be used.

The base films 604a and 604b can be formed by a sputtering method, a physical vapor deposition (PVD) method, a chemical vapor deposition (CVD) method such as a low-pressure CVD (LPCVD) method, plasma CVD method, or the like. Alternatively, the base films 604a and 604b can be formed by a droplet discharge method, a printing method (e.g., screen printing or offset printing by which a pattern is formed), a coating method such as a spin coating method, a dipping method, a dispenser method, or the like.

In this embodiment mode, the transistor 622 is a multigate thin film transistor (TFT), which includes a semiconductor layer including impurity regions serving as a source region and a drain region, a gate insulating layer, a gate electrode layer having a stacked-layers structure of two layers, and a source electrode layer and a drain electrode layer. The source electrode layer or the drain electrode layer is in contact with and electrically connects the impurity region in the semiconductor layer and a pixel electrode layer 630. A thin film transistor can be manufactured by many methods. For example, a crystalline semiconductor film is used as an active layer, a gate electrode is formed over the crystalline semiconductor film with a gate insulating film interposed therebetween, and an impurity element is added to the active layer using the gate electrode. When an impurity element is added using the gate electrode, a mask does not need to be formed for addition of the impurity element. The gate electrode can have a single-layer structure or a stacked-layers structure. The impurity region can be formed as a high-concentration impurity region and a low-concentration impurity region by controlling the concentration thereof. A structure of a thin film transistor having a low-concentration impurity region is referred to as a lightly doped drain (LDD) structure. The low-concentration impurity region can overlap with the gate electrode, and a structure of such a thin film transistor is referred to as a gate overlapped LDD (GOLD) structure. The thin film transistor has an n-type conductivity by using phosphorus (P) in the impurity region. In the case of forming a p-type thin film transistor, boron (B) or the like may be added. After that, an insulating film 611 and an insulating film 612 are formed to cover the gate electrode and the like. Dangling bonds of the crystalline semiconductor film can be terminated by a hydrogen element mixed into the insulating film 611 (and the insulating film 612).

In order to further improve planarity, an insulating film 615 and an insulating film 616 may be formed as interlayer insulating films. The insulating film 615 and the insulating film 616 can be formed using an organic material, an inorganic material, or a stacked-layer thereof. For example, the insulating film 615 and the insulating film 616 can be formed of a material selected from substances including an inorganic insulating material such as silicon oxide, silicon nitride, silicon oxynitride, silicon nitride oxide, aluminum nitride, aluminum oxynitride, aluminum nitride oxide having a higher content of nitrogen than that of oxygen, aluminum oxide, diamond-like carbon (DLC), polysilazane, nitrogen-containing carbon (CN), phosphosilicate glass (PSG), borophosphosilicate glass (BPSG), and alumina. Alternatively, an organic insulating material can be used. As the organic insulating material, a photosensitive or non-photosensitive organic insulating material, such as polyimide, acrylic, polyamide, polyimide amide, a resist, benzocyclobutene, or a siloxane resin can be used. Note that a siloxane resin corresponds to a resin having Si—O—Si bonds. Siloxane has a skeleton structure formed from a bond of silicon (Si) and oxygen (O). As a substituent, an organic group containing at least hydrogen (for example, an alkyl group or an aryl group) is used. Alternatively, a fluoro group may be used as the substituent. Further alternatively, an organic group containing at least hydrogen and a fluoro group may be used as the substituent.

By using a crystalline semiconductor film, the pixel region and the driver circuit region can be formed over the same substrate. In that case, the transistor in the pixel region and the transistor in the driver circuit region 608b are formed at the same time. The transistor used in the driver circuit region 608b constitutes a part of a CMOS circuit. Although the thin film transistor included in the CMOS circuit has a GOLD structure in this embodiment mode, it may have an LDD structure like the transistor 622.

The structure of the thin film transistor used in the present invention is not limited to the structure described in this embodiment mode, and the thin film transistor may have a single gate structure in which a single channel formation region is formed, a double gate structure in which two channel formation regions are formed, or a triple gate structure in which three channel formation regions are formed. Further, a thin film transistor in a peripheral driver circuit region may also have a single gate structure, a double gate structure, or a triple gate structure.

Note that without limitation to the method for manufacturing a thin film transistor which is described in this embodiment mode, the present invention can employ a top gate structure (e.g., a staggered structure), a bottom gate structure (e.g., an inverted staggered transistor), a dual gate structure including two gate electrode layers provided over and under a channel region each with a gate insulating film interposed therebetween, or other structures.

Next, an insulating layer 631 serving as an alignment film is formed by a printing method or a droplet discharge method to cover the pixel electrode layer 630 and the insulating film 616. Note that the insulating layer 631 can be formed as selected by using a screen printing method or an offset printing method. After forming the insulating layer 631, rubbing treatment is performed. An insulating layer 633 serving as an alignment film is similar to the insulating layer 631. Then, the sealant 692 is disposed by a droplet discharge method in a peripheral region of the pixel region.

The sealant 692 may be disposed over the substrate 600, which is an element substrate, and liquid crystal may be dropped to the substrate 600, or the sealant 692 may be disposed over the substrate 695, which is a counter substrate provided with a coloring layer 635 serving as a color filter, and liquid crystal may be dropped to the substrate 695. Accordingly, either the substrate 600, which is an element substrate, or the substrate 695, which is a counter substrate may have a sealant disposed thereover and liquid crystal dropped thereto.

As the sealant 692, a visible light curable resin, a UV curable resin, or a thermosetting resin is preferably used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine-based resin, a heterocyclic epoxy resin, a modified epoxy resin, or the like can be used.

The liquid crystal layer 632 is formed by dropping smectic liquid crystal by a dropping method similar to that of Embodiment Mode 1, according to the present invention. A plurality of droplets of smectic liquid crystal are dropped into a region surrounded by a seal pattern of a sealant over the insulating layer (the insulating layer 631 or the insulating layer 633) serving as an alignment film which is formed over the substrate (the substrate 600 or the substrate 695) so that the droplets are aligned in a line which is parallel to the rubbing direction of the insulating layer. Then, the substrate 600, which is an element substrate, and the substrate 695, which is an counter substrate provided with the insulating layer 633 serving as an alignment film, a counter electrode layer 634, and the coloring layer 635 serving as a color filter are attached to each other with the spacer 637 interposed therebetween.

The droplets of smectic liquid crystal are dropped. Then the droplets are quickly spreading a direction perpendicular to the rubbing direction over the insulating layer (the insulating layer 631 or the insulating layer 633) serving as an alignment film when the pair of substrates (the substrate 600 and the substrate 695) are attached to each other. This is because smectic liquid crystal is liquid crystal which has a layer structure and a layer direction (a direction in which layers are formed with alignment of liquid crystal molecules) is perpendicular to the rubbing direction. Accordingly, the liquid crystal fills the seal pattern of the sealant to form the liquid crystal layer 632 when droplets of the liquid crystal are dropped to be aligned in a direction parallel to the rubbing direction of the insulating film (the insulating layer 631 or the insulating layer 633) serving as the alignment film. According to the present invention, when the liquid crystal spreads to fill the seal pattern of the sealant, a bubble does not get into the liquid crystal and collision traces of the droplets do not remain, so that alignment disorder of liquid crystal molecules due to a bubble or collision of the droplets can be prevented. Accordingly, the uniform liquid crystal layer 632 of smectic liquid crystal in which alignment disorder of liquid crystal molecules, which is caused in manufacturing steps, can be prevented and the liquid crystal molecules are aligned with high accuracy can be formed.

After the substrate 600 and the substrate 695 are attached to each other with the liquid crystal layer 632 filling the seal pattern of the sealant, it is preferable that the sealant be cured or heat treatment be performed. By heat treatment, alignment disorder of the liquid crystal molecules can be further corrected. Note that such an attaching step is preferably performed under reduced pressure.

Examples of smectic liquid crystal which can be used in this embodiment mode are ferroelectric liquid crystal (FLC), and antiferroelectric liquid crystal (AFLC). Further, a UV curable resin may be added to smectic liquid crystal. For example, a polymer stabilized ferroelectric liquid crystal (PS-FLC) in which a UV curable resin is added to ferroelectric liquid crystal can be used.

A mode which is used in a liquid crystal display device of the present invention may be either a bistable mode or a monostable mode. An example of the bistable mode is a surface stabilized (SS)-FLC mode, and an example of the monostable mode is a V-FLC mode and a half V (HV)-FLC mode. As the V-FLC mode, there are a PS-V-FLC mode and an AFLC mode. As the half V (HV)-FLC mode, there are an FLC mode and a PS-HV-FLC mode.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

In the case of using PS-FLC in which a UV curable resin is added to smectic liquid crystal, it is preferable that the sealant be formed using a thermosetting resin or a UV curable resin which is cured with light having a wavelength different from a wavelength with which the UV curable resin added to the liquid crystal is cured. The sealant may be cured by either one or both light irradiation and heat treatment.

Then, a polarizing plate 641 is provided to the outer side of the counter substrate 695 and a polarizing plate 643 is provided to the opposite side of the substrate 600 from the element. The polarizing plate can be attached to the substrate with use of an adhesive layer. A retardation plate may be provided between the polarizing plate and the substrate. A filler may be mixed into the sealant, and the counter substrate 695 may be provided with a shielding film (black matrix) or the like. Note that a color filter or the like may be formed of materials which exhibit red (R), green (G), and blue (B) in the case where the liquid crystal display device is a full-color display; and the coloring layer may be omitted or may be formed of a material which exhibits at least one color in the case where the liquid crystal display device is a single-color display.

Note that the color filter is not always provided in the case where light-emitting diodes (LEDs) of RGB or the like are arranged in a backlight unit and a successive additive color mixing method (field sequential method) in which color display is performed by time division is employed. The black matrix is preferably provided so as to overlap with a transistor and a CMOS circuit for the sake of reducing reflection of external light by wirings of the transistor and the CMOS circuit. Note that the black matrix may be provided so as to overlap with a capacitor. This is because reflection by a metal film included in the capacitor can be prevented.

While the spacer may be provided in such a way that particles having a size of several micrometers are sprayed, the spacer in this embodiment mode is formed by a method in which a resin film is formed over the entire surface of the substrate and then etched. A material of the spacer is applied by a spinner and then subjected to light exposure and development to form a predetermined pattern. In addition, the material is heated at 150° C. to 200° C. in a clean oven or the like so as to be hardened. The thus manufactured spacer can have various shapes depending on the conditions of the light exposure and development. It is preferable that the spacer have a columnar shape with a flat top so that mechanical strength of the liquid crystal display device can be secured when the counter substrate is attached. The shape of the spacer can be conical, pyramidal, or the like, and there is no particular limitation thereon.

Then, a terminal electrode layer 678 electrically connected to the pixel region is attached to an FPC 694 which is a wiring board for connection, through an anisotropic conductive layer 696. The FPC 694 transmits external signals or potential. Through the foregoing steps, a liquid crystal display device having a display function can be manufactured.

A wiring and a gate electrode layer which are included in a transistor, the pixel electrode layer 630, and the counter electrode layer 634 are formed using one or a plurality of the following; indium tin oxide (ITO), indium zinc oxide (IZO) in which zinc oxide (ZnO) is mixed into indium oxide, a conductive material in which silicon oxide ($SiO_2$) is mixed into indium oxide, organic indium, organic tin, indium oxide containing tungsten oxide, indium zinc oxide containing tungsten oxide, indium oxide containing titanium oxide, or indium tin oxide containing titanium oxide; or metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag), or alloy or nitride of any of those metals.

In the case of a transmissive liquid crystal display device, a light transmitting conductive material may be used for the pixel electrode layer 630 and the counter electrode layer 634. In the case of a reflective liquid crystal display device, a reflective layer may be additionally provided. Alternatively, a reflective conductive material is used for the pixel electrode layer 630 and a light transmitting conductive material is used for the counter electrode layer 634 so that light reflected by the pixel electrode layer 630 passes through the counter electrode layer 634 and is emitted from the viewing side.

The source electrode layer or the drain electrode layer may be connected to the pixel electrode layer through a wiring layer so as to be electrically connected instead of being directly in contact with each other. Alternatively, the pixel electrode layer is partially stacked over the source electrode layer or the drain electrode layer. Further alternatively, the pixel electrode layer may be formed first and then the source electrode layer or the drain electrode layer may be formed to be in contact with the pixel electrode layer.

While the foregoing circuits are used in this embodiment mode, the present invention is not limited thereto and an IC chip may be mounted as a peripheral driver circuit by a COG method or a TAB method which are described above. Further, a gate line driver circuit and a source line driver circuit may be provided or pluralities of the gate line driver circuits and source line driver circuits may be provided.

In the liquid crystal display device of the present invention, a driving method for image display is not particularly limited, and for example, a dot sequential driving method, a line sequential driving method, an area sequential driving method, or the like may be used. Typically, the line sequential driving method is used, and a time division gray scale driving method or an area gray scale driving method may be used as appropriate. Further, an image signal inputted to the source line of the liquid crystal display device may be either an analog signal or a digital signal. The driver circuit and the like may be designed as appropriate depending on the image signal.

According to this embodiment mode, a uniform liquid crystal layer of smectic liquid crystal in which alignment disorder of liquid crystal molecules, which is caused in manufacturing steps, can be prevented and liquid crystal molecules are aligned with high accuracy can be formed. Since smectic liquid crystal like ferroelectric liquid crystal has a high response speed, a liquid crystal display device with a high response speed and reduced display defects can be manufactured by using a liquid crystal layer formed according to the present invention. Therefore, a liquid crystal display device with improved performance and image quality can be manufactured with high yield according to this embodiment mode.

This embodiment mode can be freely combined with foregoing Embodiment Mode 1.

Embodiment Mode 5

This embodiment mode describes an example of a liquid crystal display device including a uniform liquid crystal layer in which alignment disorder of liquid crystal molecules is prevented and liquid crystal molecules are aligned with high accuracy in order to achieve improved performance and image quality. In specific, a liquid crystal display device according to the present invention which includes a thin film transistor having an amorphous semiconductor film is described.

Figure 9:
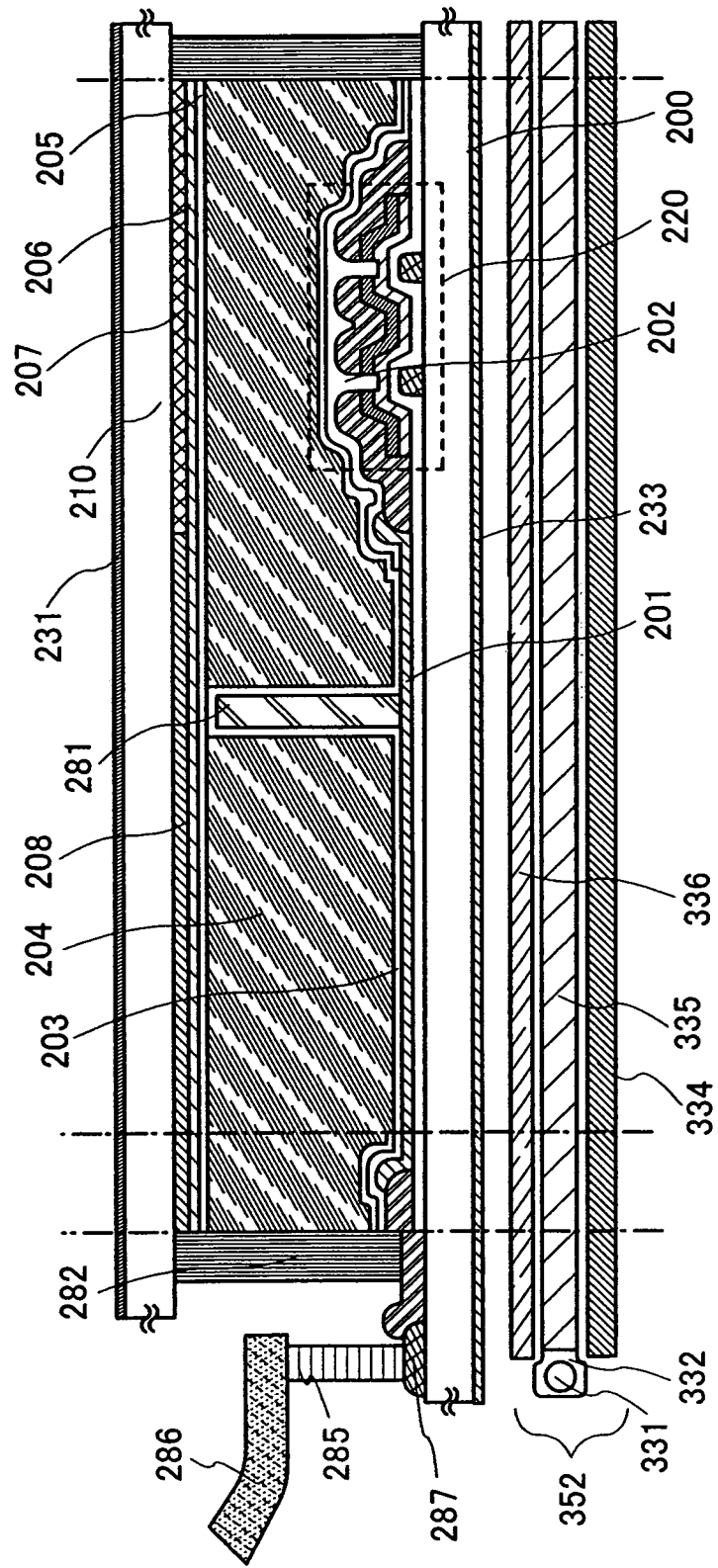
FIG. 9 is a cross-sectional view illustrating a liquid crystal display device according to an aspect of the present invention.

In the liquid crystal display device shown in FIG. 9, a pixel region and a sealing region are provided over a substrate 200, which is an element substrate. The pixel region includes a transistor 220, which is an inverted staggered thin film transistor, a pixel electrode layer 201, an insulating film 202, an insulating layer 203 serving as an alignment film, a liquid crystal layer 204, a spacer 281, an insulating layer 205 serving as an alignment film, a counter electrode layer 206, a color filter 208, a black matrix 207, a substrate 210, which is a counter substrate, a polarizing plate 231, and a polarizing plate 233. The sealing region includes a sealant 282, a terminal electrode layer 287, an anisotropic conductive layer 288, and an FPC 286.

The liquid crystal layer 204 is formed by dropping smectic liquid crystal by a dropping method similar to that of Embodiment Mode 1, according to the present invention. A plurality of droplets of smectic liquid crystal are dropped into a region surrounded by a seal pattern of a sealant over the insulating layer (the insulating layer 203 or the insulating layer 205) serving as an alignment film which is formed over the substrate (the substrate 200 or the substrate 210) so that the droplets are aligned in a line which is parallel to the rubbing direction of the insulating layer.

The droplets of smectic liquid crystal are dropped. Then the droplets are quickly spread in a direction perpendicular to the rubbing direction over the insulating layer (the insulating layer 203 or the insulating layer 205) serving as an alignment film when the pair of substrates (the substrate 200 and the substrate 210) are attached to each other. This is because smectic liquid crystal is liquid crystal which has a layer structure and a layer direction (a direction in which layers are formed due to alignment of liquid crystal molecules) is perpendicular to the rubbing direction. Accordingly, the liquid crystal fills the seal pattern of the sealant to form the liquid crystal layer 204 when droplets of the liquid crystal are dropped to be aligned in a direction parallel to the rubbing direction of the insulating film (the insulating layer 203 or the insulating layer 205) serving as the alignment film. According to the present invention, when the liquid crystal spreads to fill the seal pattern of the sealant, a bubble does not get into the liquid crystal and collision traces of the droplets do not remain, so that alignment disorder of liquid crystal molecules due to a bubble or collision of the droplets can be prevented. Accordingly, the uniform liquid crystal layer 204 of smectic liquid crystal in which alignment disorder of liquid crystal molecules, which is caused in manufacturing steps, can be prevented and the liquid crystal molecules are aligned with high accuracy can be formed.

After the substrate 200 and the substrate 210 are attached to each other with the liquid crystal layer 204 filling the seal pattern of the sealant, it is preferable that the sealant be cured or heat treatment be performed. By heat treatment, alignment disorder of the liquid crystal molecules can be further corrected. Note that such an attaching step is preferably performed under reduced pressure.

Examples of smectic liquid crystal which can be used in this embodiment mode are ferroelectric liquid crystal (FLC), and antiferroelectric liquid crystal (AFLC). Further, a UV curable resin may be added to smectic liquid crystal. For example, a polymer stabilized ferroelectric liquid crystal (PS-FLC) in which a UV curable resin is added to ferroelectric liquid crystal can be used.

A mode which is used in a liquid crystal display device of the present invention may be either a bistable mode or a monostable mode. An example of the bistable mode is a surface stabilized (SS)-FLC mode, and an example of the monostable mode is a V-FLC mode and a half V (HV)-FLC mode. As the V-FLC mode, there are a PS-V-FLC mode and an AFLC mode. As the half V (HV)-FLC mode, there are an FLC mode and a PS-HV-FLC mode.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

As the sealant, a visible light curable resin, a UV curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine-based resin, a heterocyclic epoxy resin, a modified epoxy resin, or the like can be used.

In the case of using PS-FLC in which a UV curable resin is added to smectic liquid crystal, it is preferable that the sealant be formed using a thermosetting resin or a UV curable resin which is cured with light having a wavelength different from a wavelength with which the UV curable resin added to the liquid crystal is cured. The sealant may be cured by either one or both light irradiation and heat treatment.

In the case of using an element substrate provided with a semiconductor element such as a thin film transistor as the substrate, the sealant may be disposed over the element substrate and liquid crystal may be dropped to the element substrate, or the sealant may be disposed over a counter substrate provided with a color filter, a black matrix, and the like and liquid crystal may be dropped to the counter substrate. Accordingly, either the substrate 200, which is an element substrate, or the substrate 210 may have a sealant disposed thereover and liquid crystal dropped thereto.

The transistor 220 which is an inverted staggered thin film transistor formed in this embodiment mode has a gate electrode layer, a source electrode layer, and a drain electrode layer which are formed by a droplet discharge method. The droplet discharge method is a method in which a conductive layer and an electrode layer are formed by discharging a composition containing a liquid conductive material and solidifying the composition by drying and baking. If a composition containing an insulating material is discharged and solidified through drying and baking, an insulating layer can be formed. When a droplet discharge method is employed, a constituent of a liquid crystal display device, such as a conductive layer and an insulating layer can be formed as selected, which can simplify the process and reduce a waste of materials; therefore, the liquid crystal display device can be manufactured at low cost and with high productivity.

In this embodiment mode, an amorphous semiconductor is used as a semiconductor layer, and a semiconductor layer having one conductivity type may be formed if needed. In this embodiment mode, a semiconductor layer and an n-type amorphous semiconductor layer which is the semiconductor layer having one conductivity type are stacked. Further, an n-channel thin film transistor with an NMOS structure which includes an n-type semiconductor layer, a p-channel thin film transistor with a PMOS structure which includes a p-type semiconductor layer, or a CMOS structure which includes an n-channel thin film transistor and a p-channel thin film transistor can be manufactured. In this embodiment mode, the transistor 220 is an n-channel inverted staggered thin film transistor. The transistor 220 can be a channel protective type inverted staggered thin film transistor in which a protective layer is provided over the channel region of the semiconductor layer.

In addition, an n-channel thin film transistor or a p-channel thin film transistor can be formed by doping the semiconductor layer with an element imparting conductivity and forming an impurity region. Instead of formation of the n-type semiconductor layer, a plasma treatment may be performed with a $PH_3$ gas to impart conductivity to the semiconductor layer.

The semiconductor layer can be formed with use of an organic semiconductor material as a semiconductor, by a printing method, a spray method, a spin coating method, a droplet discharge method, a dispenser method, or the like. In this case, since an etching step is not always necessary, the number of steps can be reduced. As an organic semiconductor, a low molecular material such as pentacene or a high molecular material can be used, or a material such as an organic pigment or a conductive high molecular organic material can be used. As an organic semiconductor material used in the present invention, a n-conjugated high molecular material with its skeleton including a conjugate double bond is desirable. Typically, a soluble high molecular material which is such as polythiophene, polyfluorene, poly(3-alkylthiophene), or a polythiophene derivative can be used.

The structure of a backlight unit 352 is described. The backlight unit 352 includes a light source 331 which emits light such as a cold cathode fluorescent lamp, a hot cathode fluorescent lamp, a light emitting diode, an inorganic EL, or an organic EL, a lamp reflector 332 for effectively leading light to a light guiding plate 335, the light guiding plate 335 for totally reflecting light so that light is led to the entire surface of a liquid crystal display device, a diffusing plate 336 for reducing variations in brightness, and a reflector plate 334 for reusing light leaked under the light guiding plate 335.

A control circuit for adjusting luminance of the light source 331 is connected to the backlight unit 352. The luminance of the light source 331 can be controlled by a signal supplied from the control circuit.

According to this embodiment mode, a uniform liquid crystal layer of smectic liquid crystal in which alignment disorder of liquid crystal molecules, is caused in manufacturing steps can be prevented and liquid crystal molecules are aligned with high accuracy can be formed. Since smectic liquid crystal like ferroelectric liquid crystal has a high response speed, a liquid crystal display device with a high response speed and reduced display defects can be manufactured by using a liquid crystal layer formed according to the present invention. Therefore, a liquid crystal display device with improved performance and image quality can be manufactured with high yield according to this embodiment mode.

This embodiment mode can be freely combined with foregoing Embodiment Mode 1.

Embodiment Mode 6

This embodiment mode describes operation of circuits included in the liquid crystal display device according to the present invention.

Figure 14A:
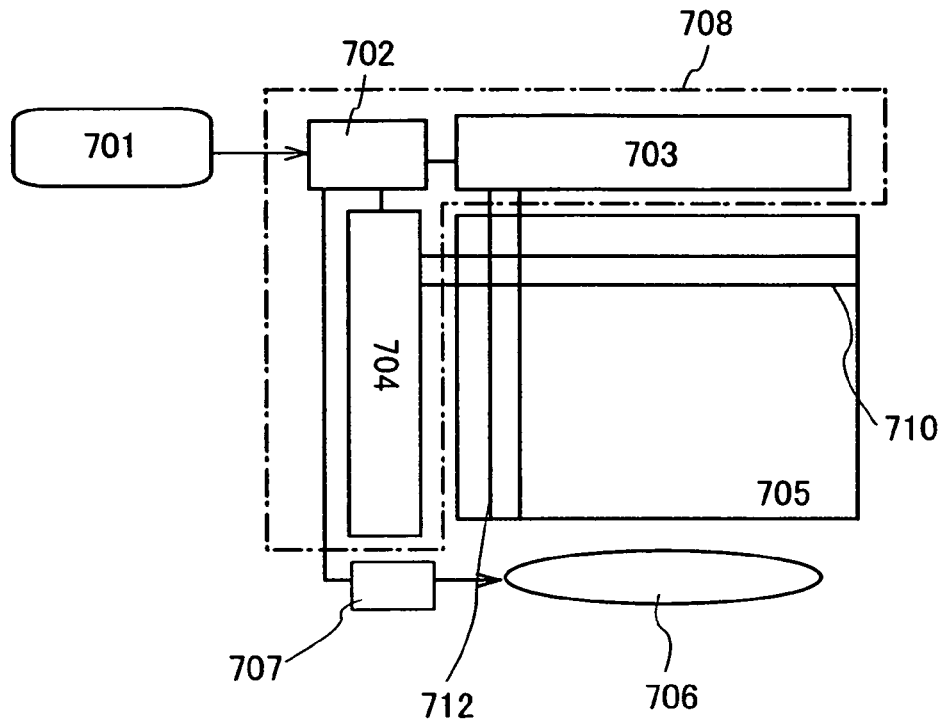
FIGS. 14A to 14C are block diagrams illustrating a liquid crystal display device according to an aspect of the present invention.
Figure 14B:
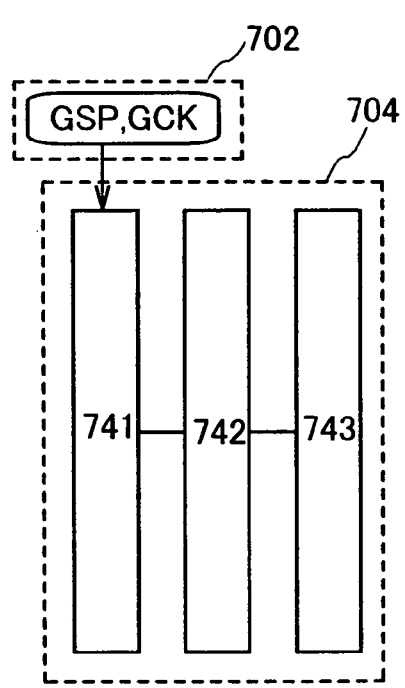
Figure 14C:
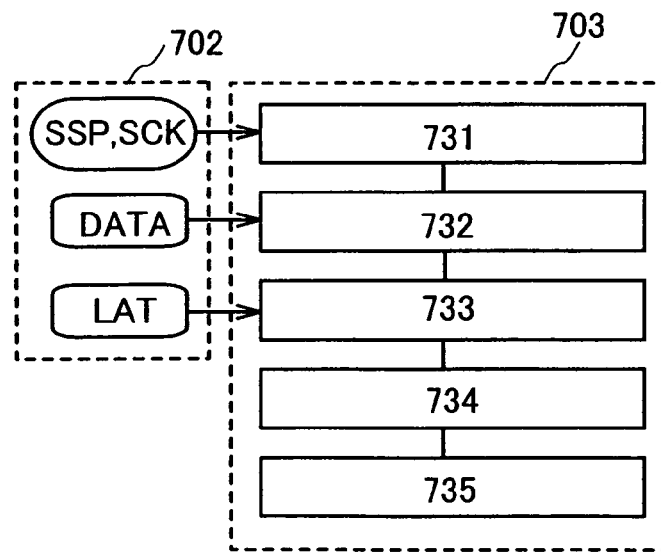

FIGS. 14A to 14C show system block diagrams of a pixel portion 705 and a driver circuit portion 708 in a liquid crystal display device.

In the pixel portion 705, a plurality of pixels are included. A switching element is provided in each intersection region of signal lines 712 and scanning lines 710, which serves as a pixel. Application of voltage for controlling tilt of liquid crystal molecules can be controlled by the switching elements. Such a structure in which a switching element is provided in each intersection region is called an active matrix type. The pixel portion of the present invention is not limited to an active matrix type, and may have a passive matrix type structure instead. The passive matrix type is manufactured by a simple process because a switching element is not included in each pixel.

The driver circuit portion 708 includes a control circuit 702, a signal line driver circuit 703, and a scanning line driver circuit 704. The control circuit 702 controls a gray scale in accordance with contents to be displayed by the pixel portion 705. Therefore, the control circuit 702 inputs a generated signal to the signal line driver circuit 703 and the scanning line driver circuit 704. When a switching element is selected by the scanning line driver circuit 704 using the scanning line 710, voltage is applied to a pixel electrode in a selected intersection region. A value of this voltage is determined based on a signal inputted from the driver circuit 703 through the signal line.

Further, in the control circuit 702, a signal for controlling electric power supplied to a lighting means 706 is generated. The signal is inputted to a power supply 707 of the lighting means 706. As the lighting means, the back light unit described in the foregoing embodiment mode can be used. Note that the lighting means may be a front light instead of the backlight unit. A front light is a platy light unit which includes a light emitter and a light guide body for illuminating the whole liquid crystal display device, and which is attached to a front surface side of the pixel portion. With such a lighting means, the pixel portion can be evenly irradiated with light, with low power consumption.

As shown in FIG. 14B, a scanning line driver circuit 704 includes circuits serving as a shift register 741, a level shifter 742, and a buffer 743. Signals such as a gate start pulse (GSP) and a gate clock signal (GCK) are inputted to the shift register 741. Note that a structure of the scanning line driver circuit of the present invention is not limited to the structure shown in FIG. 14B.

As shown in FIG. 14C, the signal line driver circuit 703 includes circuits serving as a shift register 731, a first latch 732, a second latch 733, a level shifter 734, and a buffer 735. The circuit serving as the buffer 735 is a circuit for amplifying a weak signal and includes an operational amplifier and the like. A signal such as a start pulse (SSP), a clock signal (SCK), and the like are inputted to the shift register 731 and data (DATA) such as a video signal are inputted to the first latch 732. Latch (LAT) signals can be temporarily held in the second latch 733, and they are inputted to the pixel portion 705 at a time. Such operation is referred to as line sequential driving. If the pixels perform dot sequential driving instead of the line sequential driving, the second latch is not required. Thus, a structure of a signal driver circuit of the present invention is not limited to the structure shown in FIG. 14C.

The signal line driver circuit 703, the scanning line driver circuit 704, and the pixel portion 705 as described above can be formed of semiconductor elements provided over one substrate. The semiconductor element can be formed by using a thin film transistor formed over a glass substrate. In that case, a crystalline semiconductor film may be applied to the semiconductor elements (see Embodiment Mode 4). A crystalline semiconductor film can be included in a circuit in a driver circuit portion because its characteristics, in particular, the mobility, is high. Further, the signal line driver circuit 703 and the scanning line driver circuit 704 can be mounted over the substrate by using an integrated circuit (IC) chip. In that case, an amorphous semiconductor film can be applied to a semiconductor element in the pixel portion (see Embodiment Mode 5).

According to this embodiment mode, a uniform liquid crystal layer of smectic liquid crystal in which alignment disorder of liquid crystal molecules, which is caused in manufacturing steps, can be prevented and liquid crystal molecules are aligned with high accuracy can be formed. Since smectic liquid crystal like ferroelectric liquid crystal has a high response speed, a liquid crystal display device with a high response speed and reduced display defects can be manufactured by using a liquid crystal layer formed according to the present invention. Therefore, a liquid crystal display device with improved performance and image quality can be manufactured with high yield according to this embodiment mode.

Embodiment Mode 7

This embodiment mode describes a structure of a backlight, which is a lighting means which can be used in a liquid crystal display device according to the present invention. A backlight is provided in a liquid crystal display device as a backlight unit having a light source. In the backlight unit, the light source is surrounded by a reflector plate so that light is scattered efficiently.

Figure 11A:
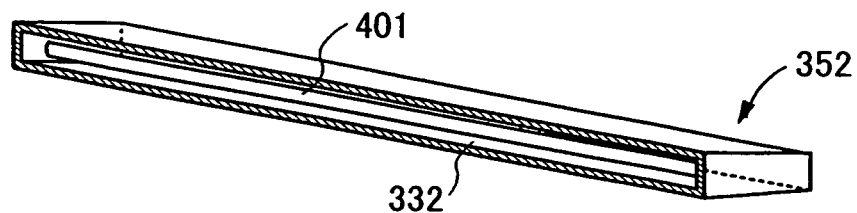
FIGS. 11A to 11D are diagrams of backlights which can be used in a liquid crystal display device according to an aspect of the present invention.

As shown in FIG. 11A, a cold cathode fluorescent lamp 401 can be used as a light source in a backlight unit 352. In order to efficiently reflect light from the cold cathode fluorescent lamp 401, a lamp reflector 332 can be provided. The cold cathode fluorescent lamp 401 is mostly used for a large-sized liquid crystal display device due to high luminance from the cold cathode fluorescent lamp. Accordingly, the backlight unit having a cold cathode fluorescent lamp can be used for a display of a personal computer.

Figure 11B:
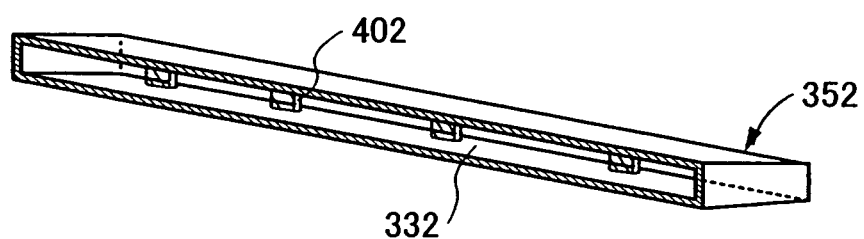

As shown in FIG. 11B, a light emitting diode 402 can be used as a light source of the backlight unit 352. For example, light emitting diodes 402 which emit white light are arranged at predetermined intervals. In order to efficiently reflect light from the light emitting diode 402, the lamp reflector 332 can be provided.

Figure 11C:
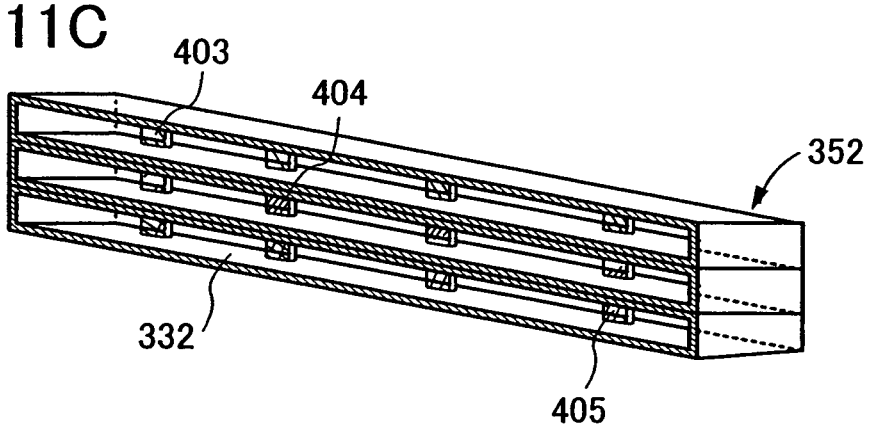

As shown in FIG. 11C, light emitting diodes 403, 404, and 405 which emit light of colors of RGB can be used as a light source in the backlight unit 352. When the light emitting diodes 403, 404, and 405 which emit light of colors of RGB are used, color reproducibility can be enhanced as compared with the case where only the light emitting diode 402 which emits white light is used. In order to efficiently reflect light from the light emission diodes, the lamp reflector 332 can be provided.

Figure 11D:
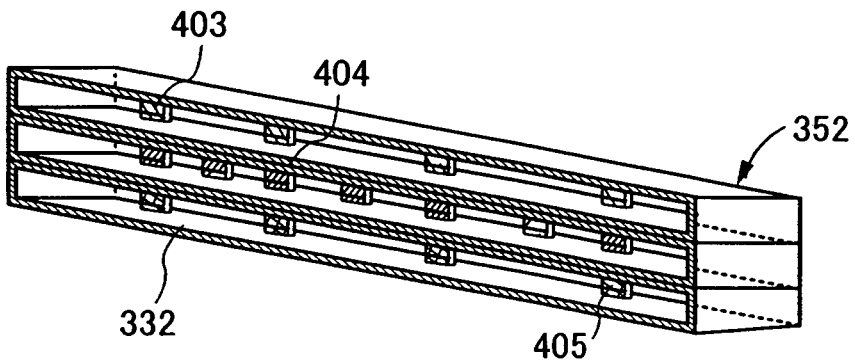

As shown in FIG. 11D, when the light emitting diodes 403, 404, and 405 which emit light of colors of RGB are used as a light source, it is not necessary that the number and arrangement of the light emitting diodes 403, 404, and 405 are the same. For example, the number of light emitting diodes which emit light of a color that has low light emitting intensity may be larger than the number of light emitting diodes which emit light of other colors.

Further, the light emitting diode 402 which emits light of a white color and the light emitting diodes 403, 404, and 405 which emit light of colors of RGB may be combined.

When a field sequential mode is applied in the case of using the light emitting diodes of RGB, color display can be performed by sequentially lighting the light emitting diodes of RGB in accordance with the time.

The light emitting diode is suitable for a large-sized liquid crystal display device because the luminance thereof is high. In addition, color reproducibility of the light emitting diode is superior to that of a cold cathode fluorescent lamp because the color purity of each color of RGB is favorable, and the area required can be reduced. Therefore, a narrower frame can be achieved when the light emitting diode is applied to a small-sized liquid crystal display device.

A light source does not need to be provided as in the backlight units shown in FIGS. 11A to 11D. For example, when a backlight having a light emitting diode is mounted on a large-sized liquid crystal display device, the light emitting diode can be disposed behind the substrate. In that case, each of the light emitting diodes can be arranged at predetermined intervals. Depending on arrangement of the light emitting diodes, color reproducibility can be enhanced.

A liquid crystal display device including the foregoing backlight and also including a uniform liquid crystal layer in which alignment disorder of liquid crystal molecules is prevented and liquid crystal molecules are aligned with high accuracy can be manufactured according to the present invention. Therefore, a liquid crystal display device with improved performance and image quality can be manufactured. A backlight having a light emitting diode is particularly suitable for a large-sized liquid crystal display device, and a high-quality image can be displayed even in a dark place by enhancing the contrast ratio of the large-sized liquid crystal display device.

This embodiment mode can be freely combined with any of foregoing Embodiment Modes 1 to 6.

Embodiment Mode 8

This embodiment mode describes an example of a liquid crystal display device including a uniform liquid crystal layer in which alignment disorder of liquid crystal molecules is prevented and liquid crystal molecules are aligned with high accuracy in order to achieve high performance and high image quality. In specific, a liquid crystal display module according to the present invention is described.

This embodiment mode is described with reference to FIGS. 10A and 10B. FIGS. 10A and 10B show examples of a liquid crystal display device (a liquid crystal display module) formed by using an element substrate 2600, which is manufactured according to the present invention.

FIG. 10A shows an example of a liquid crystal display module, in which the element substrate 2600 and a counter substrate 2601 are fixed to each other with a sealant 2602. A pixel portion 2603 including TFTs and the like, a liquid crystal layer 2604, a coloring layer 2605, and a polarizing plate 2606 are provided between the substrates to form a display region. The coloring layer 2605 is necessary to perform color display. In the case of the RGB system, coloring layers corresponding to colors of red, green, and blue are provided for pixels. Polarizing plates 2606 and 2607 and a diffuser plate 2613 are provided to an outer side of the counter substrate 2601 and the element substrate 2600. A light source includes a cold cathode fluorescent lamp 2610 and a reflector plate 2611. A circuit board 2612 is connected to the element substrate 2600 and a driving circuit 2608 by a flexible wiring board 2609. External circuits such as a control circuit and a power supply circuit are incorporated in the circuit board 2612. The polarizing plate and the liquid crystal layer may be stacked with a retardation plate interposed therebetween.

The liquid crystal display device in FIGS. 10A and 10B is an example in which the polarizing plate 2606 is provided to an outer side (a viewing side) of the counter substrate 2601 and the coloring layer 2605 is provided to an inner side of the counter substrate 2601. Note that the polarizing plate 2606 may be provided to the inner side (a liquid crystal side) of the counter substrate 2601 and the coloring layer 2605 may be provided to the outer side of the counter substrate 2601. The stacked-layers structure of the polarizing plate 2606 and the coloring layer 2605 is not limited to that shown in FIG. 10A and may be set as appropriate depending on materials of the polarizing plate 2606 and the coloring layer 2605 or conditions of manufacturing steps.

The liquid crystal layer 2604 is formed by dropping smectic liquid crystal by a dropping method similar to that of Embodiment Mode 1, according to the present invention. A plurality of droplets of smectic liquid crystal are dropped into a region surrounded by a seal pattern of a sealant over an alignment film which is formed over the substrate (the element substrate 2600 or the counter substrate 2601) so that the droplets are aligned in a line which is parallel to the rubbing direction of the alignment film.

The droplets of smectic liquid crystal are dropped. Then the droplets quickly spread in a direction perpendicular to the rubbing direction over the alignment film when the pair of substrates (the element substrate 2600 and the counter substrate 2601) are attached to each other. This is because smectic liquid crystal is liquid crystal which has a layer structure and a layer direction (a direction in which layers are formed due to alignment of liquid crystal molecules) is perpendicular to the rubbing direction. Accordingly, the liquid crystal fills the seal pattern of the sealant to form the liquid crystal layer 2604 when droplets of the liquid crystal are dropped to be aligned in a direction parallel to the rubbing direction of the alignment film. According to the present invention, when the liquid crystal spreads to fill the seal pattern of the sealant, a bubble does not get into the liquid crystal and collision traces of the droplets do not remain, so that alignment disorder of liquid crystal molecules due to a bubble or collision of the droplets can be prevented. Accordingly, the uniform liquid crystal layer 2604 of smectic liquid crystal in which alignment disorder of liquid crystal molecules, which is caused in manufacturing steps, can be prevented and the liquid crystal molecules are aligned with high accuracy can be formed.

After the element substrate 2600 and the counter substrate 2601 are attached to each other with the liquid crystal layer 2604 filling the seal pattern of the sealant, it is preferable that the sealant be cured or heat treatment be performed. By heat treatment, alignment disorder of the liquid crystal molecules can be further corrected. Note that such attaching step is preferably performed under reduced pressure.

Examples of smectic liquid crystal which can be used in this embodiment mode are ferroelectric liquid crystal (FLC), and antiferroelectric liquid crystal (AFLC). Further, a UV curable resin may be added to smectic liquid crystal. For example, a polymer stabilized ferroelectric liquid crystal (PS-FLC) in which a UV curable resin is added to ferroelectric liquid crystal can be used.

A mode which is used in a liquid crystal display device of the present invention may be either a bistable mode or a monostable mode. An example of the bistable mode is a surface stabilized (SS)-FLC mode, and an example of the monostable mode is a V-FLC mode and a half V (HV)-FLC mode. As the V-FLC mode, there are a PS-V-FLC mode and an AFLC mode. As the half V (HV)-FLC mode, there are an FLC mode and a PS-HV-FLC mode.

The insulating layer serving as an alignment film can be formed using polyimide, polyamide, or the like. The insulating layer can serve as the alignment film by being subjected to rubbing treatment, but it is not limited as long as the insulating layer can serve as an alignment film which aligns liquid crystal molecules in one direction. Light irradiation or heat treatment may be performed on the insulating layer to form an alignment film.

As the sealant, a visible light curable resin, a UV curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine-based resin, a heterocyclic epoxy resin, a modified epoxy resin, or the like can be used.

In the case of using PS-FLC in which a UV curable resin is added to smectic liquid crystal, it is preferable that the sealant be formed using a thermosetting resin or a UV curable resin which is cured with light having a wavelength different from a wavelength with which the UV curable resin added to the liquid crystal is cured. The sealant may be cured by either one or both light irradiation and heat treatment.

In the case of using an element substrate provided with a semiconductor element such as a thin film transistor as the substrate, the sealant may be disposed over the element substrate and liquid crystal may be dropped to the element substrate, or the sealant may be disposed over a counter substrate provided with a color filter, a black matrix, and the like and liquid crystal may be dropped to the counter substrate. Accordingly, either the element substrate 2600, which is an element substrate, or the counter substrate 2601 may have a sealant disposed thereover and liquid crystal dropped thereto.

FIG. 10B shows an example of a field sequential-LCD (FS-LCD) in which an above-described FLC mode is applied to the liquid crystal display module in FIG. 10A. The FS-LCD performs red, green, and blue light emissions in one frame period. Color display can be performed by composing an image using time division. Since colored light is emitted using a light emitting diode, a cold cathode fluorescent lamp, or the like; therefore, a color filter is not needed. Accordingly, it is not necessary to arrange color filters for three primary colors and to limit the display region of each color, and three colors can be displayed in any regions. Meanwhile, since light of three colors is emitted in one frame period, high-speed response of liquid crystal is needed. By applying an above-described FLC mode or an AFLC mode using an FS method to a liquid crystal display device of the present invention, a liquid crystal display device or a liquid crystal television device with high performance and high image quality can be completed.

Optical response speed of the liquid crystal display module gets higher when the cell gap of the liquid crystal display module is narrowed. The optical response speed can also get higher by reducing the viscosity of the liquid crystal material. In addition, further increase in response speed is possible by an overdrive method in which applied voltage is increased (or decreased) only for a moment.

FIG. 10B shows a transmission liquid crystal display module including a red light source 2910a, a green light source 2910b, and a blue light source 2910c as light sources. A control portion 2912 is provided in order to switch on or off the red light source 2910a, the green light source 2910b, and the blue light source 2910c. The control portion 2912 controls light emission of each color, light enters the liquid crystal, and images are composed with time division, thus color display is performed.

According to this embodiment mode, a uniform liquid crystal layer of smectic liquid crystal in which alignment disorder of liquid crystal molecules, which is caused in manufacturing steps, can be prevented and liquid crystal molecules are aligned with high accuracy can be formed. Since smectic liquid crystal like ferroelectric liquid crystal has a high response speed, a liquid crystal display device with a high response speed and reduced display defects can be manufactured by using a liquid crystal layer formed according to the present invention. Therefore, a liquid crystal display device with improved performance and image quality can be manufactured with high yield according to this embodiment mode.

This embodiment mode can be combined as appropriate with any of foregoing Embodiment Modes 1 to 8.

Embodiment Mode 9

Figure 15:
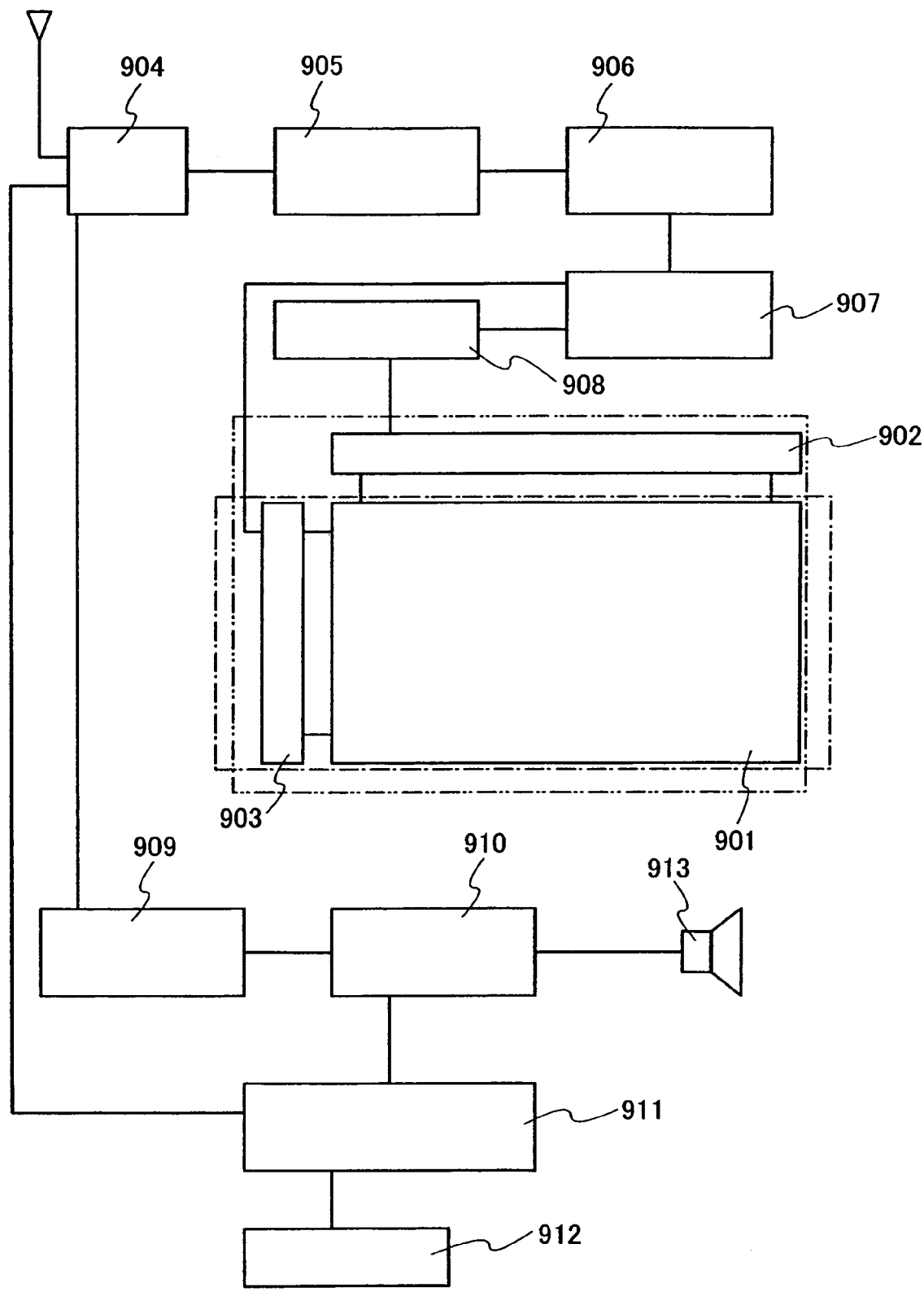
FIG. 15 is a block diagram illustrating a main structure of an electronic appliance to which the present invention is applied.

A television device (also referred to as simply a television, or a television receiver) can be completed using the liquid crystal display device formed by the present invention. FIG. 15 is a block diagram showing main components of the television device.

As for a display panel shown in FIG. 15, there are the following cases: the case where only a pixel portion 901 is formed as shown in FIG. 12A and a scanning line driver circuit 903 and a signal line driver circuit 902 are mounted by a TAB method as shown in FIG. 13B or by a COG method as shown in FIG. 13A; the case where a TFT is formed as shown in FIG. 12B, the pixel portion 901 and the scanning line driver circuit 903 are formed over a substrate, and the signal line driver circuit 902 is separately mounted as a driver IC; the case where the pixel portion 901, the signal line driver circuit 902, and the scanning line driver circuit 903 are formed over a substrate as shown in FIG. 12C; and the like. The display panel may have any of the structures.

In FIG. 15, an image signal amplifier circuit 905 which amplifies an image signal included in signals received by a tuner 904, a image signal processing circuit 906 which converts the signals outputted from the image signal amplifier circuit 905 into chrominance signals corresponding to colors of red, green, and blue, a control circuit 907 which converts the image signal into an input specification for a driver IC, and the like are provided as an external circuit on an input side of the image signal. The control circuit 907 outputs signals to both a scanning line side and a signal line side. In the case of digital driving, a structure may be employed in which a signal dividing circuit 908 may be provided on the signal line side and an input digital signal may be divided into m pieces to be supplied.

An audio signal among signals received by the tuner 904 is transmitted to an audio signal amplifier circuit 909 and an output therefrom is supplied to a speaker 913 through an audio signal processing circuit 910. A control circuit 911 receives control information such as a receiving station (reception frequency) or sound volume from an input portion 912 and transmits signals to the tuner 904 and the audio signal processing circuit 910.

Figure 16A:
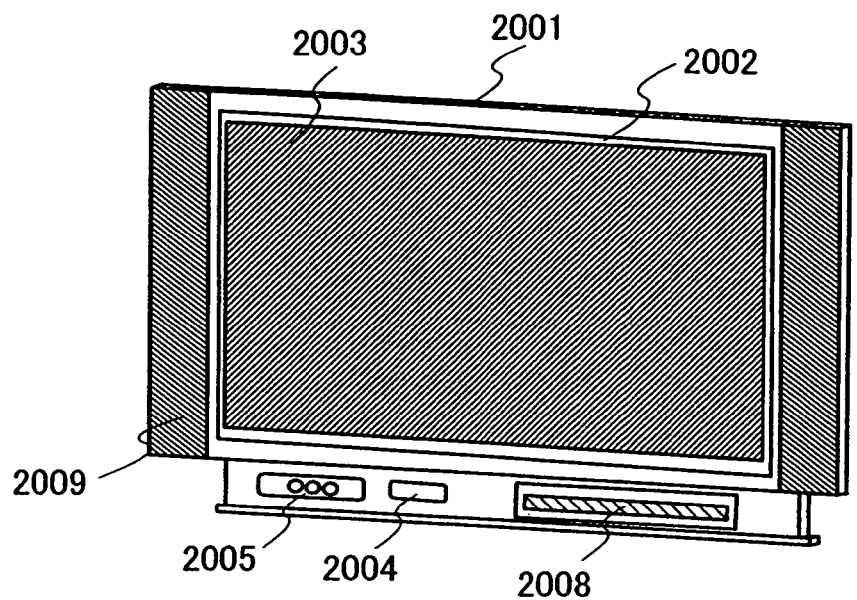
FIGS. 16A and 16B are diagrams illustrating electronic appliances according to an aspect of the present invention.
Figure 16A:
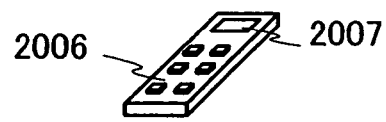
Figure 16B:
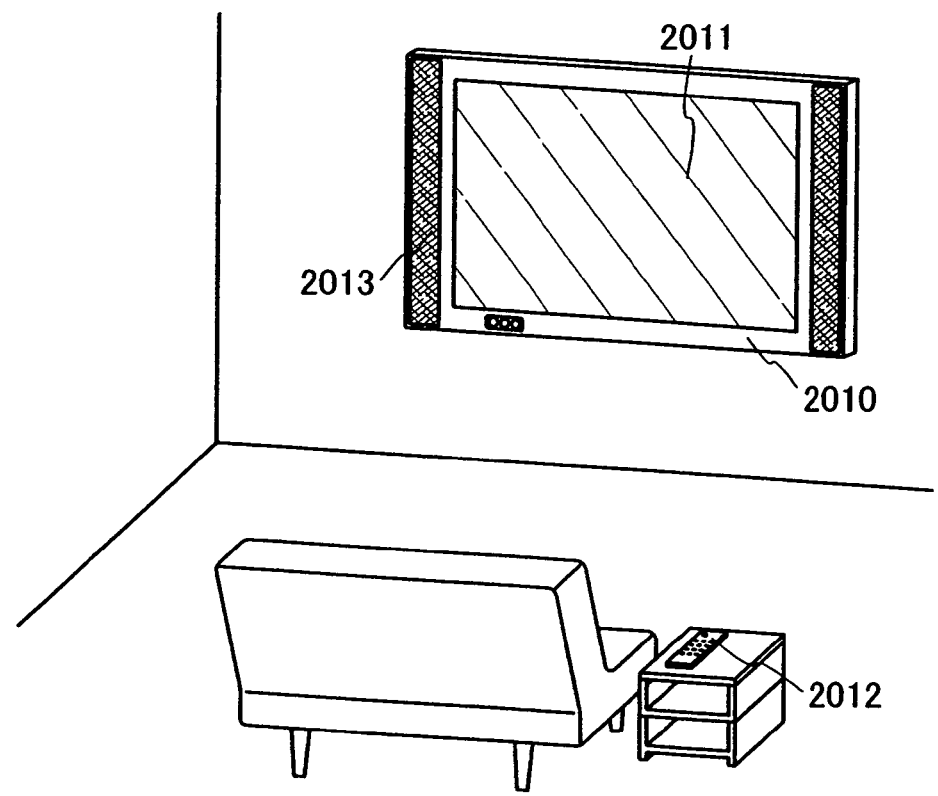

A television device can be completed by incorporating the display panel module into a chassis, as shown in FIGS. 16A and 16B. When a liquid crystal display module is used, a liquid crystal television device can be manufactured. In FIG. 16A, a main screen 2003 is formed using a display module and accessories such as a speaker portion 2009 or an operation switch are provided. In this manner, a television device can be completed according to the present invention.

A display panel 2002 is incorporated in a chassis 2001. The television device can receive general TV broadcast with a receiver 2005. When the television device is connected to a communication network by wired or wireless connections via a modem 2004, one-way (from a sender to a receiver) or two-way (between a sender and a receiver or between receivers) information communication can be performed. The television device can be operated by using a switch built in the chassis or a remote control unit 2006 which may have a display portion 2007 for displaying information to be outputted.

The television device may include a sub screen 2008 formed using a second display panel for displaying channels, sound volume, and the like, in addition to the main screen 2003. In this structure, both the main screen 2003 and the sub screen 2008 may be formed using a liquid crystal display device according to the present invention. According to the present invention, a highly-reliable liquid crystal display device can be manufactured even when a large substrate and a number of TFTs and electronic parts are used.

FIG. 16B shows a television device including a chassis 2010, a display portion 2011, a remote control unit 2012 which is an operation portion, a speaker portion 2013, and the like. The display portion 2011 is large in size, and may be 20-inch to 80-inch. The present invention is applied to manufacturing of the display portion 2011. The television device in FIG. 16B is a wall-hanging type, and does not require a large installation space.

Needles to say, the present invention is not limited to a television device. The present invention can be applied to various applications, particularly to a large-sized display media such as an information board at train stations, airports, or the like, or an advertising display screen on the street, as well as a monitor of a personal computer.

This embodiment mode can be combined as appropriate with any of foregoing Embodiment Modes 1 to 8.

Embodiment Mode 10

Examples of electronic appliances according to the present invention are as follows: a television device (also simply referred to as a television or a television receiver), a camera such as a digital camera or a digital video camera, a cellular telephone device (also simply referred to as a cellular phone or a cell-phone), an information terminal such as PDA, a portable game machine, a computer monitor, a computer, a sound reproducing device such as a car audio system, an image reproducing device including a recording medium, such as a home-use game machine, and the like. Further the present invention can be applied to any game machine having a liquid crystal display device, such as a pachinko machine, a slot machine, a pinball machine, a large-scale game machine, and the like. Specific examples are described with reference to FIGS. 17A to 17F.

Figure 17A:
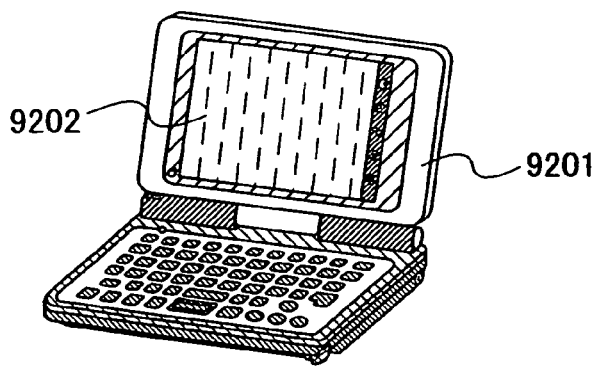
FIGS. 17A to 17F are diagrams illustrating electronic appliances according to an aspect of the present invention.

A portable information terminal device shown in FIG. 17A has a main body 9201, a display portion 9202, and the like. For the display portion 9202, a liquid crystal display device according to the present invention can be applied. As a result, a highly functional portable information terminal device by which high quality images with excellent visibility can be displayed can be provided.

Figure 17B:
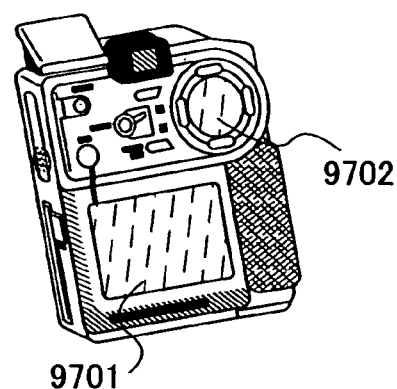

A digital video camera shown in FIG. 17B has a display portion 9701, a display portion 9702, and the like. For the display portion 9701, a liquid crystal display device according to the present invention can be applied. As a result, a highly functional digital video camera by which high quality images with excellent visibility can be displayed can be provided.

Figure 17C:
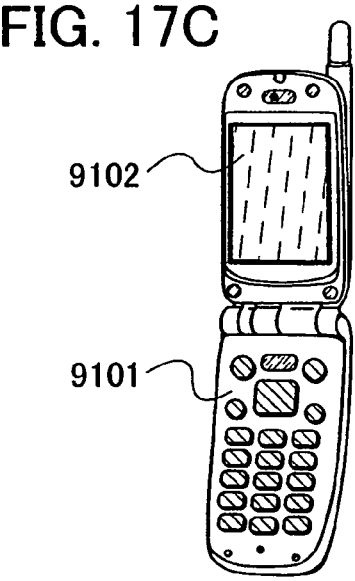

A cellular phone shown in FIG. 17C has a main body 9101, a display portion 9102, and the like. For the display portion 9102, a liquid crystal display device of the present invention can be applied. As a result, a highly functional cellular phone by which high quality images with excellent visibility can be displayed can be provided.

Figure 17D:
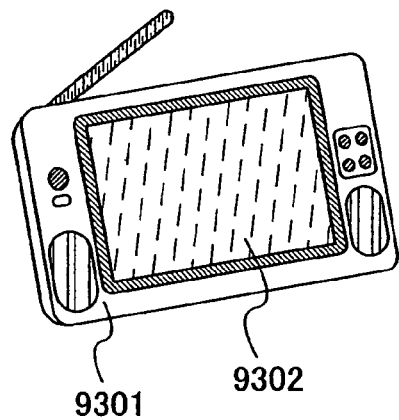

A portable television device shown in FIG. 17D has a main body 9301, a display portion 9302, and the like. For the display portion 9302, a liquid crystal display device of the present invention can be applied. As a result, a highly functional portable television device by which high quality images with excellent visibility can be displayed can be provided. Furthermore, for the television device, the liquid crystal display device according to the present invention can be applied to a wide range of television devices, from small devices installed in portable terminals such as cellular phones and the like as well as mid-sized devices which can be picked up and carried, all the way up to large-sized devices (for example, displays of 40 inches and above).

Figure 17E:
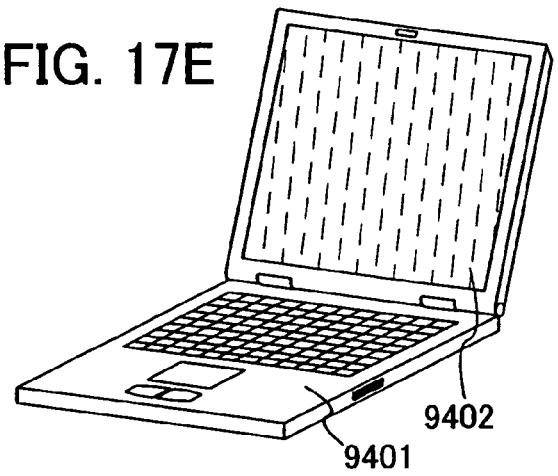

A portable computer shown in FIG. 17E has a main body 9401, a display portion 9402, and the like. For the display portion 9402, a liquid crystal display device of the present invention can be applied. As a result, a highly functional portable computer by which high quality images with excellent visibility can be displayed can be provided.

Figure 17F:
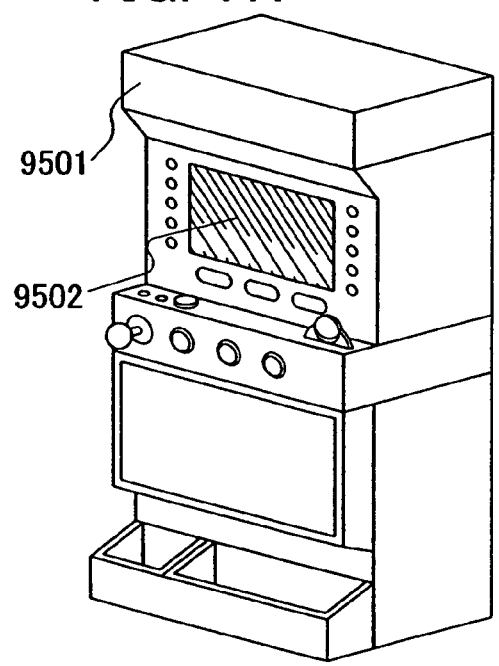

A slot machine shown in FIG. 17F has a main body 9501, a display portion 9502, and the like. For the display portion 9502, a liquid crystal display device of the present invention can be applied. As a result, a highly functional slot machine by which high quality images with excellent visibility can be displayed can be provided.

In this way, by the liquid crystal display device according to the present invention, highly functional electronic appliances by which high quality images with excellent visibility can be displayed can be provided.

This embodiment mode can be combined as appropriate with any of foregoing Embodiment Modes 1 to 9.

Embodiment

This embodiment describes a method for manufacturing a transmissive liquid crystal display device according to the present invention. The ferroelectric liquid crystal (FLC) which was used is smectic liquid crystal of FELIX M4851/100 (manufactured by AZ Electronic Materials) and AL1054 (manufactured by JSR Corporation) was used as an insulating layer serving as an alignment film.

A counter substrate was provided with a columnar spacer (the height thereof was 1.5 µm) in advance and the gap between a pixel electrode of an element substrate and a counter electrode of the counter substrate was 1.5 µm.

First, the element substrate and the counter substrate were washed and an insulating layer serving as an alignment film (the thickness thereof is 35 nm) was formed over each of the element substrate and the counter substrate by a printing method. Pre-baking was carried out at 50° C. for 3 minutes, then, baking was carried out at 180° C. for 1 hour using a clean oven.

Then, rubbing treatment was performed on the element substrate and the counter substrate. The conditions of the rubbing treatment are as follows: a pile impression was 0.2 mm, a rotation speed of rubbing roller was 100 rpm, a substrate moving speed was 10 mm/sec, and the rubbing treatment was performed once. Note that parallel rubbing was employed in which rubbing directions of the substrates were parallel as in FIGS. 1A to 1C. After the rubbing treatment, the substrates were washed by a washer to remove dirt such as dust from a rubbing cloth.

Then, a UV curable sealant (world lock No. 717 (manufactured by Kyoritsu Chemical & Co., Ltd.)) was applied over the counter substrate. The sealant was formed into a continuous loop shape.

Then, the FLC was dropped to the counter substrate. Since the FLC has high viscosity at room temperature, dropping with high accuracy is impossible. Therefore, the dropping was carried out at 75° C. so that a temperature at which the FLC is in the isotropic phase or higher was kept. Note that the speed of spreading of the FLC which has been dropped is higher in a direction perpendicular to the rubbing direction than in a rubbing direction. Therefore, the FLC was dropped so that droplets are aligned along the rubbing direction. Note that the number of droplets were 4 (9 mg) and the droplets were dropped near the center part of the sealant. A region into which the droplets of liquid crystal are dropped and which includes a pixel portion (a region which was to be filled with the liquid crystal) was about 4 inches.

Note that if the FLC which has been dropped is changed to a ferroelectric phase soon after the dropping, the droplets of FLC would be formed over the counter substrate to have a large height, which leads to a problem such that the gap between the element substrate and the counter substrate cannot be reduced in an attaching step which is carried out later. Therefore, in this embodiment, the temperature of a dropping stage was kept at 75° C., which is higher than a temperature at which the FLC is in the isotropic phase. In this manner, the height of the droplets of FLC which have been dropped can be small.

Then, the element substrate and the counter substrate were attached to each other in a vacuum. First, a chamber was evacuated into 100 Pa and the gap between the element substrate and the counter substrate was reduced using alignment markers on the element substrate and the counter substrate. The gap was closed until the sealant was in contact with both of the substrates. Local UV light irradiation was carried out using a UV light irradiator to temporally fix the substrates. Then, the chamber was opened to an atmosphere. At this time, the FLC was not spread across the entire portion.

Then, a UV curable sealant was cured using a UV light irradiator. During the step, a light shielding mask was used so as not to irradiate the FLC in the pixel portion with UV light. After that, the substrates were cut and the cut substrates were subjected to heat treatment at 120° C. for 1 hour using a clean oven. Thus, the FLC was spread across the entire pixel portion. The FLC was spread in a manner such that bubble was not left in the center part of the pixel portion because the FLC had been dropped so that the droplets were aligned in a direction parallel to the rubbing direction.

Then, an FPC was attached by thermocompression bonding. After that a polarizing plate was attached to each substrate. Thus, a transmissive FLC display was manufactured.

As described above, when FLC is dropped so that droplets thereof are aligned in a direction parallel to the rubbing direction, a liquid crystal display with reduced alignment disorder and without bubble left in its pixel portion can be manufactured.

This application is based on Japanese Patent Application serial no. 2007-077137 filed with Japan Patent Office on Mar. 23, 2007, the entire contents of which are hereby incorporated by reference.

What is claimed is:

1. A method for manufacturing a liquid crystal display device, comprising:
    forming a continuous loop shaped seal pattern comprising a sealant over one of a pair of substrates;
    dropping a plurality of droplets of smectic liquid crystal over one of the pair of substrates on which rubbing treatment is performed so that the plurality of droplets of the smectic liquid crystal is aligned in only one line parallel to a direction of the rubbing treatment; and
    fixing the pair of substrates to each other with the sealant to sandwich the smectic liquid crystal,
    wherein the step of dropping the plurality of droplets of the smectic liquid crystal is performed on a dropping stage, the dropping stage being kept at a temperature higher than a temperature at which the smectic liquid crystal is in an isotropic phase so that the plurality of droplets of the smectic liquid crystal spread in the continuous loop shaped seal pattern, and
    wherein the spread plurality of droplets is in contact with four sides of the continuous loop shaped seal pattern.

2. The method for manufacturing a liquid crystal display device according to claim 1, further comprising heating at least the smectic liquid crystal so that the smectic liquid crystal further spreads in the continuous loop shaped seal pattern.

3. The method for manufacturing a liquid crystal display device according to claim 1,
    wherein the smectic liquid crystal is either ferroelectric liquid crystal or anti ferroelectric liquid crystal.

4. The method for manufacturing a liquid crystal display device according to claim 1,
    wherein a UV curable resin is added to the smectic liquid crystal.

5. The method for manufacturing a liquid crystal display device according to claim 1,
    wherein the pair of substrates are light transmitting substrates.

6. The method for manufacturing a liquid crystal display device according to claim 1,
    wherein the one of the pair of substrates over which the continuous loop shaped seal pattern is formed is a counter substrate.

7. The method for manufacturing a liquid crystal display device according to claim 1,
    wherein the one of the pair of substrates over which the continuous loop shaped seal pattern is formed is an element substrate.

8. The method for manufacturing a liquid crystal display device according to claim 1,
    wherein the plurality of droplets of the smectic liquid crystal is dropped at the same time.

9. The method for manufacturing a liquid crystal display device according to claim 1,
    wherein the plurality of droplets of the smectic liquid crystal is dropped while being heated.

10. The method for manufacturing a liquid crystal display device according to claim 1,
    wherein the one of the pair of substrates over which the continuous loop shaped seal pattern is formed and the one of the pair of substrates over which the plurality of droplets of the smectic liquid crystal is dropped are the same.

11. A method for manufacturing a liquid crystal display device, comprising:
    forming a continuous loop shaped seal pattern comprising a sealant over one of a pair of substrates;
    dropping a plurality of droplets of smectic liquid crystal over one of the pair of substrates on which rubbing treatment is performed so that the plurality of droplets of the smectic liquid crystal is partially overlapped with one another and aligned in only one line parallel to a direction of the rubbing treatment; and
    fixing the pair of substrates to each other with the sealant to sandwich the smectic liquid crystal,
    wherein the step of dropping the plurality of droplets of the smectic liquid crystal is performed on a dropping stage, the dropping stage being kept at a temperature higher than a temperature at which the smectic liquid crystal is in an isotropic phase so that the plurality of droplets of the smectic liquid crystal spread in the continuous loop shaped seal pattern, and
    wherein the spread plurality of droplets is in contact with four sides of the continuous loop shaped seal pattern.

12. The method for manufacturing a liquid crystal display device according to claim 11, further comprising heating at least the smectic liquid crystal so that the smectic liquid crystal further spreads in the continuous loop shaped seal pattern.

13. The method for manufacturing a liquid crystal display device according to claim 11,
    wherein the smectic liquid crystal is either ferroelectric liquid crystal or anti ferroelectric liquid crystal.

14. The method for manufacturing a liquid crystal display device according to claim 11,
    wherein a UV curable resin is added to the smectic liquid crystal.

15. The method for manufacturing a liquid crystal display device according to claim 11,
   wherein the pair of substrates are light transmitting substrates.

16. The method for manufacturing a liquid crystal display device according to claim 11,
   wherein the one of the pair of substrates over which the continuous loop shaped seal pattern is formed is a counter substrate.

17. The method for manufacturing a liquid crystal display device according to claim 11,
   wherein the one of the pair of substrates over which the continuous loop shaped seal pattern is formed is an element substrate.

18. The method for manufacturing a liquid crystal display device, according to claim 11,
   wherein the plurality of droplets of the smectic liquid crystal is dropped at the same time.

19. The method for manufacturing a liquid crystal display device, according to claim 11,
   wherein the plurality of droplets of the smectic liquid crystal is dropped while being heated.

20. The method for manufacturing a liquid crystal display device according to claim 11,
   wherein the one of the pair of substrates over which the continuous loop shaped seal pattern is formed and the one of the pair of substrates over which the plurality of droplets of the smectic liquid crystal is dropped are the same.

* * * * *